(12) United States Patent
Hong et al.

(10) Patent No.: US 10,243,718 B2
(45) Date of Patent: Mar. 26, 2019

(54) SYSTEMS AND METHODS FOR FULL-DUPLEX SIGNAL SHAPING

(71) Applicant: The Board of Trustees of the Leland Stanford Junior University, Palo Alto, CA (US)

(72) Inventors: Steven Hong, Stanford, CA (US); Sachin Katti, Stanford, CA (US); Jeff Mehlman, Mountain View, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 15/133,175

(22) Filed: Apr. 19, 2016

(65) Prior Publication Data

US 2016/0234005 A1 Aug. 11, 2016

Related U.S. Application Data

(63) Continuation of application No. 13/762,043, filed on Feb. 7, 2013, now Pat. No. 9,325,432.

(Continued)

(51) Int. Cl.
*H04B 1/04* (2006.01)
*H04B 1/18* (2006.01)
(Continued)

(52) U.S. Cl.
CPC .......... *H04L 5/1423* (2013.01); *H04B 1/0475* (2013.01); *H04B 1/18* (2013.01);
(Continued)

(58) Field of Classification Search
CPC ... H04L 5/1423; H04L 5/143; H04L 27/2626; H04L 27/2647; H04B 1/0475; H04B 1/18; H04B 1/525; H04B 1/56; H04B 15/00
See application file for complete search history.

(56) References Cited

U.S. PATENT DOCUMENTS 3,922,617 A 11/1975 Denniston
4,952,193 A 8/1990 Talwar
(Continued)

FOREIGN PATENT DOCUMENTS

EP 0755141 A2 1/1997
EP 1959625 B1 2/2009
(Continued)

OTHER PUBLICATIONS

Adib et al., "See Through Walls with Wi-Fi!," Proceedings of the ACM SIGCOMM 2013 conference on SIGCOMM, SIGCOMM '13, pp. 75-86, ACM, New York, NY, USA, (2013).
(Continued)

*Primary Examiner* — Nguyen T Vo
(74) *Attorney, Agent, or Firm* — Alston & Bird LLP

(57) ABSTRACT

A system for processing signals includes an interference cancellation component that samples an RF transmit signal, transforms the sampled RF transmit signal into a self-interference cancellation signal, and combines the sampled RF transmit signal and self-interference cancellation signal to remove a first portion of interference from the RF receive signal, the combination forming a processed RF signal; and a filtering component that removes a second portion of interference from the processed signal by downconverting the processed RF signal to a processed baseband signal, sampling the processed baseband signal to create a processed digital signal, and filtering the processed digital signal to remove the second portion of interference.

27 Claims, 6 Drawing Sheets

Related U.S. Application Data

(60) Provisional application No. 61/596,628, filed on Feb. 8, 2012.

(51) Int. Cl.

| | | |
|---|---|---|
| *H04B 1/56* | (2006.01) | |
| *H04L 5/14* | (2006.01) | |
| *H04B 1/525* | (2015.01) | |
| *H04B 15/00* | (2006.01) | |
| *H04L 27/26* | (2006.01) | |

(52) U.S. Cl.
CPC .............. *H04B 1/525* (2013.01); *H04B 1/56* (2013.01); *H04B 15/00* (2013.01); *H04L 5/143* (2013.01); *H04L 27/2626* (2013.01); *H04L 27/2647* (2013.01)

(56) References Cited

U.S. PATENT DOCUMENTS

| | | | |
|---|---|---|---|
| 5,212,827 A | 5/1993 | Meszko et al. | |
| 5,444,864 A | 8/1995 | Smith | |
| 5,691,978 A | 11/1997 | Kenworthy | |
| 5,734,967 A | 3/1998 | Kotzin et al. | |
| 5,790,658 A | 8/1998 | Yip et al. | |
| 5,930,301 A | 7/1999 | Chester et al. | |
| 6,215,812 B1 | 4/2001 | Young et al. | |
| 6,411,250 B1 | 6/2002 | Oswald et al. | |
| 6,539,204 B1 | 3/2003 | Marsh et al. | |
| 6,567,649 B2 | 5/2003 | Souissi | |
| 6,639,551 B2 | 10/2003 | Li et al. | |
| 6,725,017 B2 | 4/2004 | Blount et al. | |
| 6,745,018 B1 | 6/2004 | Zehavi et al. | |
| 6,965,657 B1 | 11/2005 | Rezvani et al. | |
| 7,336,940 B2 | 2/2008 | Smithson | |
| 7,349,505 B2 | 3/2008 | Blount et al. | |
| 7,362,257 B2 | 4/2008 | Bruzzone et al. | |
| 7,426,242 B2 | 9/2008 | Thesling | |
| 7,564,396 B2 | 7/2009 | Van Veldhoven et al. | |
| 7,869,527 B2 | 1/2011 | Vetter et al. | |
| 8,005,235 B2 | 8/2011 | Gupta et al. | |
| 8,060,803 B2 | 11/2011 | Kim | |
| 8,086,191 B2 | 12/2011 | Fukuda et al. | |
| 8,155,595 B2 | 4/2012 | Sahin et al. | |
| 8,175,535 B2 | 5/2012 | Mu | |
| 8,179,990 B2 | 5/2012 | Orlik et al. | |
| 8,218,697 B2 | 7/2012 | Guess et al. | |
| 8,331,477 B2 | 12/2012 | Huang et al. | |
| 8,351,533 B2 | 1/2013 | Shrivastava et al. | |
| 8,385,871 B2 | 2/2013 | Wyville | |
| 8,422,540 B1 | 4/2013 | Negus et al. | |
| 8,755,756 B1 | 6/2014 | Zhang et al. | |
| 8,995,410 B2 | 3/2015 | Balan et al. | |
| 9,042,838 B2 | 5/2015 | Braithwaite | |
| 9,054,795 B2 | 6/2015 | Choi et al. | |
| 9,065,519 B2 | 6/2015 | Cyzs et al. | |
| 9,077,421 B1 | 7/2015 | Mehlman et al. | |
| 9,124,475 B2 | 9/2015 | Li et al. | |
| 9,184,902 B2 | 11/2015 | Khojastepour et al. | |
| 9,325,432 B2 * | 4/2016 | Hong ...................... | H04B 15/00 |
| 2002/0064245 A1 | 5/2002 | McCorkle | |
| 2003/0031279 A1 | 2/2003 | Blount et al. | |
| 2003/0099287 A1 | 5/2003 | Arambepola | |
| 2003/0148748 A1 | 8/2003 | Shah | |
| 2004/0106381 A1 | 6/2004 | Tiller | |
| 2005/0078743 A1 | 4/2005 | Shohara | |
| 2005/0129152 A1 | 6/2005 | Hillstrom | |
| 2005/0159128 A1 | 7/2005 | Collins et al. | |
| 2005/0190870 A1 | 9/2005 | Blount et al. | |
| 2005/0254555 A1 | 11/2005 | Teague | |
| 2005/0282500 A1 | 12/2005 | Wang et al. | |
| 2006/0029124 A1 | 2/2006 | Grant et al. | |
| 2006/0030277 A1 | 2/2006 | Cyr et al. | |
| 2006/0058022 A1 | 3/2006 | Webster et al. | |
| 2006/0083297 A1 | 4/2006 | Yan et al. | |
| 2006/0209754 A1 | 9/2006 | Ji et al. | |
| 2007/0018722 A1 | 1/2007 | Jaenecke | |
| 2007/0105509 A1 | 5/2007 | Muhammad et al. | |
| 2007/0207747 A1 | 9/2007 | Johnson et al. | |
| 2007/0223617 A1 | 9/2007 | Lee et al. | |
| 2007/0249314 A1 | 10/2007 | Sanders et al. | |
| 2007/0274372 A1 | 11/2007 | Asai et al. | |
| 2008/0037801 A1 | 2/2008 | Alves et al. | |
| 2008/0089397 A1 | 4/2008 | Vetter et al. | |
| 2008/0107046 A1 | 5/2008 | Kangasmaa et al. | |
| 2008/0131133 A1 | 6/2008 | Blunt et al. | |
| 2008/0192636 A1 | 8/2008 | Briscoe et al. | |
| 2008/0219339 A1 | 9/2008 | Chrabieh et al. | |
| 2008/0219377 A1 | 9/2008 | Nisbet | |
| 2009/0022089 A1 | 1/2009 | Rudrapatna | |
| 2009/0034437 A1 | 2/2009 | Shin et al. | |
| 2009/0047914 A1 | 2/2009 | Axness et al. | |
| 2009/0115912 A1 | 5/2009 | Liou et al. | |
| 2009/0180404 A1 | 7/2009 | Jung et al. | |
| 2009/0186582 A1 | 7/2009 | Muhammad et al. | |
| 2009/0221231 A1 | 9/2009 | Weng et al. | |
| 2009/0303908 A1 | 12/2009 | Deb et al. | |
| 2010/0014600 A1 | 1/2010 | Li et al. | |
| 2010/0014614 A1 | 1/2010 | Leach et al. | |
| 2010/0022201 A1 | 1/2010 | Vandenameele | |
| 2010/0031036 A1 | 2/2010 | Chauncey et al. | |
| 2010/0056166 A1 | 3/2010 | Tenny | |
| 2010/0103900 A1 | 4/2010 | Yeh et al. | |
| 2010/0117693 A1 | 5/2010 | Lorg et al. | |
| 2010/0136900 A1 | 6/2010 | Seki | |
| 2010/0150033 A1 | 6/2010 | Zinser et al. | |
| 2010/0159837 A1 | 6/2010 | Dent et al. | |
| 2010/0159858 A1 | 6/2010 | Dent et al. | |
| 2010/0215124 A1 | 8/2010 | Zeong et al. | |
| 2010/0226416 A1 | 9/2010 | Dent et al. | |
| 2010/0226448 A1 | 9/2010 | Dent | |
| 2010/0232324 A1 | 9/2010 | Radunovic et al. | |
| 2010/0279602 A1 | 11/2010 | Larsson et al. | |
| 2010/0295716 A1 | 11/2010 | Yamaki et al. | |
| 2011/0013684 A1 | 1/2011 | Semenov et al. | |
| 2011/0026509 A1 | 2/2011 | Tanaka | |
| 2011/0149714 A1 | 6/2011 | Rimini et al. | |
| 2011/0171922 A1 | 7/2011 | Kim et al. | |
| 2011/0216813 A1 | 9/2011 | Baldemair et al. | |
| 2011/0222631 A1 | 9/2011 | Jong | |
| 2011/0243202 A1 | 10/2011 | Lakkis | |
| 2011/0256857 A1 | 10/2011 | Chen et al. | |
| 2011/0268232 A1 | 11/2011 | Park et al. | |
| 2011/0311067 A1 | 12/2011 | Harris et al. | |
| 2011/0319044 A1 | 12/2011 | Bornazyan | |
| 2012/0021153 A1 | 1/2012 | Bhandari et al. | |
| 2012/0063369 A1 | 3/2012 | Lin et al. | |
| 2012/0063373 A1 | 3/2012 | Chincholi et al. | |
| 2012/0140685 A1 | 6/2012 | Lederer et al. | |
| 2012/0147790 A1 | 6/2012 | Khojastepour et al. | |
| 2012/0154249 A1 | 6/2012 | Khojastepour et al. | |
| 2012/0155335 A1 | 6/2012 | Khojastepour et al. | |
| 2012/0155336 A1 | 6/2012 | Khojastepour et al. | |
| 2012/0201153 A1 | 8/2012 | Bharadia et al. | |
| 2012/0201173 A1* | 8/2012 | Jain ........................ | H04B 1/525 370/277 |
| 2013/0005284 A1 | 1/2013 | Dalipi | |
| 2013/0044791 A1 | 2/2013 | Rimini et al. | |
| 2013/0089009 A1 | 4/2013 | Li et al. | |
| 2013/0102254 A1 | 4/2013 | Cyzs et al. | |
| 2013/0114468 A1 | 5/2013 | Hui et al. | |
| 2013/0155913 A1 | 6/2013 | Sarca | |
| 2013/0166259 A1 | 6/2013 | Weber et al. | |
| 2013/0194984 A1 | 8/2013 | Cheng et al. | |
| 2013/0215805 A1 | 8/2013 | Hong et al. | |
| 2013/0225101 A1 | 8/2013 | Basaran et al. | |
| 2013/0253917 A1 | 9/2013 | Schildbach | |
| 2013/0301487 A1 | 11/2013 | Khandani | |
| 2013/0301488 A1 | 11/2013 | Hong et al. | |
| 2014/0126437 A1 | 5/2014 | Patil et al. | |
| 2014/0169236 A1 | 6/2014 | Choi et al. | |
| 2014/0206300 A1 | 7/2014 | Hahn et al. | |
| 2014/0219139 A1 | 8/2014 | Choi et al. | |
| 2014/0348018 A1 | 11/2014 | Bharadia et al. | |

(56) References Cited

U.S. PATENT DOCUMENTS

| | | |
|---|---|---|
| 2015/0156003 A1 | 6/2015 | Khandani |
| 2015/0156004 A1 | 6/2015 | Khandani |
| 2016/0226653 A1 | 8/2016 | Bharadia et al. |
| 2016/0266245 A1 | 9/2016 | Bharadia et al. |
| 2017/0264420 A1 | 9/2017 | Bharadia et al. |

FOREIGN PATENT DOCUMENTS

| | | | |
|---|---|---|---|
| EP | 2237434 | A1 | 10/2010 |
| EP | 2267946 | A2 | 12/2010 |
| JP | 2001-196994 | A | 7/2001 |
| JP | 2004-56315 | A | 2/2004 |
| RU | 2256985 | C2 | 7/2005 |
| WO | WO 2009/106515 | A1 | 9/2009 |
| WO | WO 2012/106262 | A1 | 8/2012 |
| WO | WO 2012/106263 | A1 | 8/2012 |
| WO | WO 2013/185106 | A1 | 12/2013 |
| WO | WO 2014/093916 | A1 | 6/2014 |
| WO | WO 2014/121290 | A1 | 8/2014 |
| WO | WO 2015/021481 | A2 | 2/2015 |
| WO | WO 2015/048678 | A1 | 4/2015 |
| WO | WO 2015/073905 | A2 | 5/2015 |

OTHER PUBLICATIONS

Archer, et al., "Interface Contracts for TinyOS," IPSN '07: Proceedings of the 6th international conference on Information processing in sensor networks, pp. 158-165 (2007).

Aryafar, et al., "MIDU: Enabling MIMO Full Duplex," Proceedings of the 18th annual international conference on Mobile computing and networking, Mobicom '12, pp. 257-268, (2012).

Bahl, et al., "Reconsidering Wireless Systems With Multiple Radios," ACM SIG-COMM CCR, (2004).

Bahl, et al., "White Space Networking with Wi-Fi like Connectivity," SIGCOMM Comput. Commun. Rev., 39(4):27-38, (2009).

Bardwell, "Tech Report." [Retrieved from the Internet Dec. 3, 2016: <http://www.connect802.com/download/techpubs/2005/commercial_radios_E052315.pdf>].

Bharadia, "Full Duplex Backscatter," Proceedings of the 12th ACM Workshop on Hot Topics in Networks, 7 pages, ACM, (2013).

Bicket, "Bit-rate Selection in Wireless Networks," Master's thesis, MIT, 2005.

Bindu et al., "Active microwave imaging for breast cancer detection," Progress in Electromagnetics Research, vol. 58: 149-169, (2006).

Blefari-Melazzi, et al., "TCP Fairness Issues in IEEE 802.11 Networks: Problem Analysis and Solutions Based on Rate Control," IEEE Transactions on Wireless Communications, 6(4): 1346-1355 (2007).

Bliss, et al., "Simultaneous Transmission and Reception for Improved Wireless Network Performance," Proceedings of the 2007 IEEE Workshop on Statistical Signal Processing, (2007).

Bortz, et al., "The Simplex Gradient and Noisy Optimization Problems," North Carolina State University, Department of Mathematics, Center for Research in Scientific Computation, (1998).

Boyd, "Sequential Convex Programming." [Retrieved from the Internet Oct. 26, 2016: http://www.stanford.edu/class/ ee364b/lectures/seq_slides.pdf].

Briggs, et al., "Power Measurements of OFDM Signals," IEEE Symposium on Electromagnetic Compatibility, (2004).

Burlingame, et al., "An Analog CMOS High-Speed Continuous-Time FIR Filter," Solid-State Circuits Research Laboratory, Department of Electrical and Computer Engineering, University of California, Davis, CA, (2000).

Cavoukian, "Whole Body Imaging in Airport Scanners: Building in Privacy by Design," Information and Privacy Commissioner of Ontario, Mar. 2009. [Retrieved from the Internet Oct. 25, 2016: https://www.ipc.on.ca/wp-content/uploads/ . . . /wholebodyimaging.pdf].

Chandra, "A Case for Adapting Channel Width in Wireless Networks," ACM SIGCOMM, (2008).

Choi, et al., "Granting Silence to Avoid Wireless Collisions," Proceedings of the 18th International Conference on Network Protocols (ICNP), (2010).

Choi, et al., "IEEE 802.11e Contention-Based Channel Access (EDCF) Performance Evaluation." IEEE ICC (2003).

Choi, et al., "The Case for a Network Protocol Isolation Layer," Sensys '09: Proceedings of the 7th ACM Conference on Embedded networked sensor systems (SenSys), pp. 267-280, (2009).

Chu, et al., "The Design and Implementation of a Declarative Sensor Network System," Proceedings of the 5th international conference on Embedded networked sensor system, (2007).

Coffman, et al., "Channel Fragmentation in Dynamic Spectrum Access Systems—a Theoretical Study," ACM SIGMETRICS, (2010).

Culler, et al., "Towards a Sensor Network Architecture: Lowering the Waistline," Proceedings of the Tenth Workshop on Hot Topics in Operating Systems (HotOS-X), (2005).

Ding, "Digital Predistortion of Power Amplifiers for Wireless Applications," Ph.D Thesis, School of Electrical and Computer Engineering, Georgia Institute of Technology, (Mar. 2004).

Duarte et al., "Experimental-driven Characterization of Full-Duplex Wireless Systems," (2011). [Retrieved from the Internet Oct. 25, 2016: https://arxiv.org/abs/1107.1276].

Duarte, "Experiment-driven Characterization of Full-Duplex Wireless Systems," CoRR, abs/1107.1276, (2011).

Duarte, et al., "Full-Duplex Wireless Communications Using Off-The-Shelf Radios: Feasibility and First Results," Forty-Fouth Asilomar Conference on Signals, Systems, and Components, (2010).

Ekanadham, "Continuous Basis Pursuit and its Applications," PhD thesis, New York, NY, USA, AAI3546394, (2012).

Erceg et al., "TGn channel models," Tech. Rep. IEEE P802.11, Wireless LANs, Garden Grove, Calif, USA, (2004).

Ettus Research, UHD Daughterboard Application Notes. [Retrieved from the Internet Dec. 8, 2016: <http://files.ettus.com/uhd_docs/manual/html/dboards.html>].

Ettus Research, Universal Software Radio Peripheral (USRP). [Retrieved from the Internet Dec. 3, 2016: <http://www.ettus.com>].

Everett, et al., "Empowering Full-Duplex Wireless Communication by Exploiting Directional Diversity," 2011 Conference Record of the Forty Fifth Asilomar Conference on Signals, Systems and Computers, pp. 2002-2006, (Nov. 2011).

Everett, et al., "Passive Self-Interference Suppression for Full-Duplex Infrastructure Nodes," CoRR, abs/1302.2185, (2013).

FCC, Table of Frequency Allocations. [Retrieved from the Internet Dec. 3, 2016: <http://transition.fcc.gov/oet/spectrum/table/fcctable.pdf>].

FDA, "Medical Imaging," [Retrieved from the Internet Oct. 25, 2016: http://www.fda.gov/Radiation-EmittingProducts/RadiationEmittingProductsandProcedures/MedicalImaging/MedicalX-Rays/ucm115317.htm].

Fear et al., "Confocal Microwave Imaging for Breast Cancer Detection: Localization of Tumors in Three Dimensions," IEEE Transactions on Biomedical Engineering, 49(8):812-822, (2002).

Fear et al., "Microwave Detection of Breast Cancer," IEEE Transactions on Microwave Theory and Techniques, 48(11):1854-1863, (2000).

Fear, et al., "Enhancing breast tumor detection with near-field imaging," Microwave Magazine, IEEE, 3(1):48-56, (2002).

Fleury et al., "Channel Parameter Estimation in Mobile Radio Environments Using the SAGE Algorithm," IEEE Journal on Selected Areas in Communications, 17(3):434-450, (1999).

Gember, et al., "A Comparative Study of Handheld and Non-Handheld Traffic in Campus Wi-Fi Networks," Passive and Active Measurement Conf., (2011).

Gheorma, et al., "Rf Photonic Techniques for Same Frequency Simultaneous Duplex Antenna Operation," IEEE Photonics Technology Letters, 19(13): 1014-1016, (2007).

Gill, Side Presentation: "RF performance of mobile terminals—a challenge for the industry," Cambridge Wireless Radio Technology Special Interest Group (SIG), (2011).

Gizmodo, "IPhone 4 Antenna-Gate," (2011). [Retrieved from the Internet Dec. 3, 2016: <http://gizmodo.com/5846638/giz-explains-whats-so-smart-about-the-iphone-455-antenna>].

(56) References Cited

OTHER PUBLICATIONS

Gnawali, et al., "Collection Tree Protocol," Proceedings of the 7th ACM Conference on Embedded Networked Sensor Systems (SenSys), pp. 1-14 (2009).
Goldsmith, "Wireless Communications," Cambridge University Press, (2004).
Gollakota, et al., "They Can Hear Your Heartbeats: Non-Invasive Security for Implantable Medical Devices," SIGCOMM Comput. Commun. Rev., 41(4), (Aug. 2011).
Gollakota, et al., "ZigZag Decoding: Combating Hidden Terminals in Wireless Networks," SIGCOMM '08: Proceedings of the ACM SIGCOMM 2008 Conference on Data Communication, pp. 159-170, (2008).
Gummadi, et al., "Understanding and Mitigating the Impact RF Interference on 802.11 Networks," Proceedings of the 2007 conference on Applications, technologies, architectures, and protocols for computer communications (SIGCOMM), (2007).
Guo et al., "Microwave Imaging via Adaptive Beamforming Methods for Breast Cancer Detection," Progress In Electromagnetics Research, vol. 1, 350-353, (2005).
Halperin, et al., "Taking the Sting out of Carrier Sense: Interference Cancellation for Wireless LANs." MobiCom '08: Proceedings of the 14th ACM international conference on Mobile computing and networking, pp. 339-350, (2003).
Harashima, "Matched-Transmission Technique for Channels With Intersymbol Interference," IEEE Transaction on Communications, COM-20:774-780, (1972).
Hong et al., "Picasso: Flexible RF and Spectrum Slicing," In Proceedings of the ACM SIGCOMM 2012 conference on Applications, technologies, architectures, and protocols for computer communication, SIGCOMM '12, pp. 283-284, ACM, Helsinki, Finland, (2012).
Hong, et al, "DOF: A Local Wireless Information Plane," ACM SIGCOMM, (2011).
Hua, et al., "A method for Broadband Full-Duplex Mimo Radio," IEEE Signal Processing Letters, 19(12):793-796, (Dec. 2012).
Huang, "Optimal Transmission Strategies for Dynamic Spectrum Access in Cognitive Radio Networks," IEEE Transactions on Mobile Computing, 8(12): 1636-1648, (2009).
Huyer, et al., "SNOBFIT—Stable Noisy Optimization by Branch and Fit," ACM Trans. Math. Softw., 35:9:1-9:25, (Jul. 2008).
Intersil Corp, "Qhx220 Active Isolation Enhancer and Interference Canceller," [Retrieved from the Internet Dec. 6, 2016: <http://www.intersil.com/content/dam/Intersil/documents/qhx2/qhx220.pdf>].
Italian National Research Council, "Dielectric Properties of Body Tissues," [Retrieved from the Internet Oct. 25, 2016: http://niremf.ifac.cnr.it/tissprop/].
Iyer, et al., "Specnet: Spectrum Sensing Sans Frontiers," USENIX NSDI, (2011).
Jain et al., "Practical, Real-time, Full Duplex Wireless," MobiCom '11, pp. 301-312, ACM, New York, NY, USA, (2011).
Jamieson, et al., "PPR: Partial Packet Recovery for Wireless Networks," Proceedings of the 2007 conference on Applications, technologies, architectures, and protocols for computer communications (SIGCOMM), (2007).
Jiang, et al., "An Architecture for Energy Management in Wireless Sensor Networks," Proceedings of the International Workshop on Wireless Sensornet Architecture (WWSNA), (2007).
Jung, et al., "A Reconfigurable Carrier Leakage Canceler for UHF RFID Reader Front-Ends," IEEE Transactions on Circuits and Systems I: Regular Papers, 58(1):70-76, (Jan. 2011).
Khojastepour, et al., "The Case for Antenna Cancellation for Scalable Full Duplex Wireless Communications," ACM HOTNETS, (2011).
Kim, et al., "Co-Channel Interference Cancellation Using Single Radio Frequency and Baseband Chain," IEEE Transactions on Communications, 58(7):2169-2175, (2010).
Kim, et al., "Flush: A Reliable Bulk Transport Protocol for Multihop Wireless Networks," In Proceedings of the Fifth ACM Conference on Embedded networked sensor systems (SenSys), (2007).
Klues, et al., "Integrating Concurrency Control and Energy Management in Device Drivers," Proceedings of twenty-first ACM SIGOPS symposium on Operating systems principles (SOSP), (2007).
Knox, "Single Antenna Full Duplex Communications using a Common Carrier," 2012 IEEE 13th Annual Wireless and Microwave Technology Conference (WAMICON), pp. 1-6, (2012).
Lakshminarayanan, et al., "Rfdump; An Architecture for Monitoring the Wireless Ether," ACM CoNEXT, (2009).
Lamprecht, et al., "Passive Alignment of Optical Elements in a Printed Circuit Board," Electric Components and Technology Conference, (2006).
Lee, et al., "Improving Wireless Simulation Through Noise Modeling," Proceedings of the 6th intenational conference on Information processing in sensor networks (IPSN), pp. 21-30, (2007).
Leith, et al., "TCP Fairness in 802.11e WLANs," IEEE Communications Letters, 9(12), (2005).
Levis, et al., "T2: A Second Generation OS For Embedded Sensor Networks," Technical Report TKN-05-007, Telecommunication on Networks Group, Technische Universitat Berlin, (2005).
Liang, et al., "Sensing-Throughput Tradeoff for Cognitive Radio Networks," IEEE Transactions on Wireless Communications, 7(4): 1326-1337, (2008).
Liang, et al., "Surviving Wi-Fi Interference in Low Power Zigbee Networks," Proceedings of the Eighth ACM Conference on Embedded Networked Sensor Systems (SenSys), (2010).
Lin, et al., "Data Discovery and Dissemination with DIP," Proceedings of the 7th international conference on Information processing in sensor networks (IPSN), pp. 433-444, (2008).
Matheus, "Optimal Design of a Multicarrier Systems with Soft Impulse Shaping Including Equalization in Time or Frequency Direction," Global Telecommunications Conference, 1997, GLOBECOM '97, IEEE, vol. 1, pp. 310-314, (Nov. 1997).
Maxim Integrated, Power Amplifier Data-sheet. [Retrieved from the Internet Dec. 6, 2016: <http://datasheets.maximintegrated.com/en/ds/MAX2828-MAX2829.pdf>].
Mini-circuits, Power Amplifier Data-sheet. [Retrieved from the Internet Dec. 6, 2016: <http://www.minicircuits.com/pdfs/PGA-105+.pdf>].
Mini-Circuits, Power Amplifier Data-sheet. [Retrieved from the Internet Dec. 6, 2016: <http://www.minicircuits.com/pdfs/Zhl-30W-262+.pdf>].
Morgan, et al, "A Generalized Memory Polynomial Model for Digital Predistortion of RF Power Amplifiers," IEEE Transactions on Signal Processing, 54(10):3852-3860, (2006).
National Instruments, N1 5781 Datasheet, (2011). [Retrieved from the Internet Dec. 6, 2016: <http://sine.ni.com/ds/app/doc/p/id/ds-212/lang/en>].
National Instruments, NI PXIe-8133 User Manual, (Jul. 2012). [Retrieved from the Internet Dec. 13, 2016: <www.ni.com/pdf/manuals/372870d.pdf>].
National Instruments, White Paper: "Understanding Dynamic Hardware Specifications," (Mar. 2010).
Palazzi, et al., "A RIO-Like Technique for Interactivity Loss-Avoidance in Fast-Paced Multiplayer Online Games," ACM Computers in Entertainment, (2005).
Peregrine Semiconductor, PE 47303 Data-sheet. [Retrieved from the Internet Dec. 6, 2016: <http://www.psemi.com/pdf/datasheets/pe43703ds.pdf>].
Polastre, et al., "A Unifying Link Abstraction for Wireless Sensor Networks," SenSys '05: Proceedings of the 3rd international conference on Embedded networked sensor systems, pp. 76-89, (2005).
Poston, et al., "Discontiguous OFDM Considerations for Dynamic Spectrum Access in Idle TV Channels," IEEE DySPAN, (2005).
Radunović, et al., "Efficiency and Fairness in Distributed Wireless Networks Through Self-Interference Cancellation and Scheduling," Technical Report MSR-TR-2009-27, Microsoft Research, (2009).
Radunović, et al., "Rethinking Indoor Wireless Mesh Design: Low Power, Low Frequency, Full-duplex," Fifth IEEE Workshop on Wireless Mesh Networks (WiMesh), pp. 1-6, (2010).
Rahul, et al., "Learning to Share: Narrowband-Friendly Wideband Networks," ACM SIGCOMM, (2008).

(56) References Cited

OTHER PUBLICATIONS

Rice University, WARP Project. [Retrieved from the Internet Dec. 8, 2016: <http://warp.rice.edu>].
Rohde & Schwarz, "Rohde & Schwarz FSW Signal and Spectrum Analyzer User Manual," (2016). [Retrieved from the Internet Dec. 10, 2016: <https://cdn.rohde-schwarz.com/pws/dl_downloads/dl_common_library/dl_manuals/gb_1/f/fsw_1/FSW_UserManual_en_26.pdf>].
Rohde & Schwarz, "Rohde & Schwarz SMBV 100A Signal Generator User Manual," (2016). [Retrieved from the Internet Dec. 6, 2016: <https://cdn.rohde-schwarz.com/pws/dl_downloads/dl_common_library/dl_manuals/gb_1/s/smbv/SMBV100A_OperatingManual_en_16.pdf>].
Sahai et al., "On the Impact of Phase Noise on Active Cancellation in Wireless Full-Duplex," (2012). [Retrieved from the Internet Oct. 25, 2016: https://arxiv.org/pdf/1212.5462].
Sahai, et al., "Spectrum Sensing: Fundamental limits," draft chapter for a Springer Book: Cognitive Radios: System Design Perspective, (Jun. 2009).
Sen, et al., "AccuRate: Constellation Based Rate Estimation in Wireless Networks," Proceedings of the Seventh USENIX Symposium on Networked Systems Design and Implementation (NSDI), (2010).
Sen, et al., "CSMA/CN: Carrier Sense Multiple Access with Collision Notification," Proceedings of the 16th annual international conference on Mobile computing and networking (MobiCom), pp. 25-36, (2010).
Shen, et al., "Channel Estimation in OFDM Systems," Application Note, Freescale Semiconductor, (2006).
Srinivasan, et al., "An Empirical Study of Low-Power Wireless," ACM Transactions on Sensor Networks, 6(2):1-49, (2010).
Srinivasan, et al., "RSSI is Under Appreciated," Proceedings of the Third Workshop on Embedded Networked Sensors (EmNepts), (2006).
Srinivasan, et al., "Some Implications of Low Power Wireless to IP Networking," Proceedings of the Fifth Workshop on Hot Topics in Networks (HotNets-V), (Nov. 2006).
Srinivasan, et al., "The κ-Factor: Inferring Protocol Performance Using Inter-Link Reception Correlation," Proceedings of the 16th annual international conference on Mobile computing and networking (MobiCom), (2010).
Srinivasan, et al., The β-factor: Measuring Wireless Link Burstiness, Proceedings of the Sixth ACM Conference on Embedded Networked Sensor Systems, (Nov. 2008).
Sundstrom et al., "Power Dissipation Bounds for High-Speed Nyquist Analog-to-Digital Converters," IEEE Transactions on Circuits and Systems I: Regular Papers, 56(3):509-518, (2009).
Surowiec et al., "Dielectric Properties of Breast Carcinoma and the Surrounding Tissues," IEEE Transactions on Biomedical Engineering, 35(4):257-263, (1988).
Tan, et al., "Fine Grained Channel Access in Wireless LAN," ACM SIGCOMM, (2010).
Tan, et al., "Spectrum Virtualization Layer," MSR Tech Report, (2011). [Retrieved from the Internet Dec. 8, 2016: <http://research.microsoft.com/apps/pubs/default.aspx?id=154410>].
Tavakoli, et al., "A Declarative Sensornet Architecture," Proceedings of the International Workshop on Wireless Sensornet Architecture (WWSNA), (2007).
Tibshirani, "Regression shrinkage and selection via the lasso," Journal of the Royal Statistical Society, Series B (Methodological), pp. 267-288 (1996).
Tomlinson,"New Automatic Equaliser Employing Modulo Arithmetic," Electronic Letters, 7(516):138-139, (1971).
Tourrilhes, "Fragment Adaptive Reduction: Coping with Various interferers in radio unlicensed bands," IEEE IC, (2001).
Tse et al., "Fundamentals of Wireless Communications," Aug. 13, 2004. [Retrieved from the Internet Oct. 25, 2016: www.eecs.berkeley.edu/~dtse/main.pdf].
Vutukuru, et al., "Cross-Layer Wireless Bit Rate Adaption," SIGCOMM Comput. Commun. Rev., 39(4):3-14, (2009).
Weingarten, et al., "The Capacity Region of the Gaussian Multiple-Input Multiple-Output Broadcast Channel," IEEE Transactions on Information Theory, 52(9):3936-3964, (2006).
Wi-Fi Alliance WiFi Direct Industry White Paper, (2010). [Retrieved from the Internet Dec. 13, 2016: <http://www.wi-fi.org/discover-wi-fi/wi-fi-direct>].
Wikipedia, "Star Trek Tricoder," [Retrieved from the Internet Oct. 26, 2016: http://en.wikipedia.org/wiki/Tricorder].
Winter, et al., "RPL: IPv6 Routing Protocol for Low power and Lossy Networks," IETF Internet draft (Work in Progress), (Jul. 2010). [Retrieved from the Internet Dec. 8, 2016; <https://tools.ietf.org/id/draft-ietf-roll-rpl-11.txt>].
Wischik, et al., "Design, implementation and evaluation of congestion control for multipath TCP," USENIX NSDI, (2011).
Xilinx, DS249: LogiCore IP CORDIC v4.0 Data Sheet, (Mar. 1, 2011). [Retrieved from the Internet Dec. 3, 2016: <http://www.xilinx.com/support/documentation/ip_documentation/cordic_ds249.pdf>].
Xilinx, UG193:XtremeDSP User Guide, (Jan. 26, 2012). [Retrieved from the Internet Dec. 6, 2016: <https://www.xilinx.com/support/documentation/user_guides/ug193.pdf>].
Xiong et al., "ArrayTrack: A Fine-Grained Indoor Location System" In Proceedings of the 10th USENIX conference on Networked Systems Design and Implementation, nsdi'13, pp. 71-84, USENIX Association, Berkeley, CA, USA, (2013).
Yang, et al., "Supporting Demanding Wireless Applications with Frequency-agile Radios," USENIX NSDI, (2010).
Yang, et al., "The Spaces Between Us: Sensing and Maintaining Boundaries in Wireless Spectrum Access," ACM MOBICOM, (2010).
Yoo, et al., "On the Optimality of Multiantenna Broadcast Scheduling Using Zero-Forcing Beamforming," IEEE Journal on Selected Areas in Communications, 24(3):528-541, (2006).
Yuan, et al., "KNOWS: Kognitiv Networking Over White Spaces," IEEE DySPAN, (2007).
Zhang et al., "A novel method for microwave breast cancer detection," Progress In Electromagnetics Research, vol. 83: 413-434, (2008).
Zhang, et al., "Gain/Phase Imbalance-Minimization Techniques for LINC Transmitters," IEEE Transactions on Microwave Theory and Techniques, 49(12):2507-2516, (2001).
U.S. Appl. No. 13/293,069, Final Office Action dated May 2, 2017.
U.S. Appl. No. 13/293,069, Non-Final Office Action dated Jan. 6, 2017.
U.S. Appl. No. 13/293,072, Non-Final Office Action dated Jan. 13, 2017.
Bharadia et al., "Full Duplex Radios" SIGOMM, Aug. 12-16, 2013, Hong Kong, China, Copyright 2013 ACM 978-1-4503-2056-6/6/13/08, 12 pages.
Chinese Application No. 201380041721.0, First Office Action dated Nov. 18, 2015.
EPO Application No. 20130801200, Supplementary European Search Report dated Feb. 4, 2016.
PCT International Preliminary Report on Patentablility for application PCT/US2012/023183 dated Aug. 6, 2013.
PCT International Preliminary Report on Patentablility for application PCT/US2012/023184 dated Aug. 6, 2013.
PCT International Preliminary Report on Patentablility for application PCT/US2013/044830 dated Dec. 9, 2014.
PCT International Preliminary Report on Patentability for application PCT/US2013/075166 dated Jun. 16, 2015.
PCT International Preliminary Report on Patentability for application PCT/US2014/014726 dated Aug. 4, 2015.
PCT International Preliminary Report on Patentablility for application PCT/US2014/050584 dated Feb. 9, 2016.
PCT International Preliminary Report on Patentablility for application PCT/US2014/058117 dated Mar. 29, 2016.
PCT International Preliminary Report on Patentablility for application PCT/US2014/065814 dated May 17, 2016.
PCT International Search Report and Written Opinion of the International Searching Authority for application PCT/US2012/023183 dated May 17, 2012.

(56) References Cited

OTHER PUBLICATIONS

PCT International Search Report and Written Opinion of the International Searching Authority for application PCT/US2012/023184 dated May 7, 2012.
PCT International Search Report and Written Opinion of the International Searching Authority for application PCT/US2013/075166 dated Apr. 22, 2014.
PCT International Search Report and Written Opinion of the International Searching Authority for application PCT/US2014/014726 dated Jun. 2, 2014.
PCT International Search Report and Written Opinion of the International Searching Authority for application PCT/US2014/050584 dated Jan. 21, 2015.
PCT International Search Report and Written Opinion of the International Searching Authority for application PCT/US2014/058117 dated Dec. 30, 2014.
PCT International Search Report and Written Opinion of the International Searching Authority for application PCT/US2014/065814 dated Feb. 19, 2015.
PCT International Search Report for application PCT/US2013/044830 dated Sep. 26, 2013.
PCT Written Opinion of the International Searching Authority for application PCT/US2013/044830 dated Sep. 26, 2013.
U.S. Appl. No. 13/293,069, Final Office Action dated Jun. 8, 2016.
U.S. Appl. No. 13/293,069, Final Office Action dated Oct. 21, 2014.
U.S. Appl. No. 13/293,069, Non-Final Office Action dated May 1, 2014.
U.S. Appl. No. 13/293,069, Non-Final Office Action dated Jul. 17, 2013.
U.S. Appl. No. 13/293,069, Non-Final Office Action dated Sep. 21, 2015.
U.S. Appl. No. 13/293,072, Final Office Action dated Mar. 15, 2016.
U.S. Appl. No. 13/293,072, Final Office Action dated Mar. 31, 2014.
U.S. Appl. No. 13/293,072, Non-Final Office Action dated Jul. 17, 2015.
U.S. Appl. No. 13/293,072, Non-Final Office Action dated Jul. 19, 2013.
U.S. Appl. No. 13/762,043, Final Office Action dated Jun. 8, 2015.
U.S. Appl. No. 13/762,043, Non-Final Office Action dated Nov. 17, 2014.
U.S. Appl. No. 13/762,043, Notice of Allowance dated Nov. 9, 2015.
U.S. Appl. No. 13/913,323, Final Office Action dated Apr. 21, 2015.
U.S. Appl. No. 13/913,323, Non-Final Office Action dated Mar. 12, 2015.
U.S. Appl. No. 13/913,323, Notice of Allowance dated Feb. 12, 2016.
U.S. Appl. No. 13/913,323, Notice of Allowance dated Oct. 16, 2015.
U.S. Appl. No. 13/913,323, Notice of Allowance dated Nov. 5, 2015.
U.S. Appl. No. 13/913,323, Notice of Allowance dated Nov. 13, 2015.
U.S. Appl. No. 14/456,807, Non-Final Office Action dated Mar. 4, 2016.
U.S. Appl. No. 13/293,069, Advisory Action dated Aug. 29, 2017.
U.S. Appl. No. 13/293,069, Notice of Allowance dated Sep. 27, 2017.
U.S. Appl. No. 13/293,069, Notice of Allowance dated Oct. 6, 2017.
U.S. Appl. No. 13/293,072, Final Office Action dated Aug. 3, 2017.
U.S. Appl. No. 14/456,807, Non-Final Office Action dated Oct. 25, 2017.
U.S. Appl. No. 15/025,256, Non-Final Office Action dated Oct. 19, 2017.
U.S. Appl. No. 13/293,072, Applicant Initiated Interview Summary dated Aug. 7, 2018.
U.S. Appl. No. 13/293,072, Final Office Action dated Apr. 5, 2018.
U.S. Appl. No. 13/293,072, Notice of Allowance dated Oct. 17, 2018.
U.S. Appl. No. 14/456,807, Non-Final Office Action dated Sep. 21, 2018.
U.S. Appl. No. 14/456,807, Notice of Allowance dated Jun. 6, 2018.
U.S. Appl. No. 15/025,256, Notice of Allowance dated May 21, 2018.
U.S. Appl. No. 15/025,256, Notice of Allowance dated Sep. 13, 2018.
U.S. Appl. No. 13/293,072, Notice of Allowance dated Dec. 27, 2018.
U.S. Appl. No. 15/025,256, Notice of Allowance dated Jan. 3, 2019.

\* cited by examiner

SYSTEMS AND METHODS FOR FULL-DUPLEX SIGNAL SHAPING

CROSS-REFERENCE TO RELATED APPLICATIONS

This Application is a Continuation of U.S. application Ser. No. 13/762,043, filed on Feb. 7, 2013 and entitled, "SYSTEMS AND METHODS FOR FULL-DUPLEX SIGNAL SHAPING", which Application claims priority to U.S. Provisional Patent Application No. 61/596,628, filed on Feb. 8, 2012 and entitled, "ENABLING ALGORITHMS AND RF CIRCUITRY FOR FULL DUPLEX COMMUNICATION OVER ARBITRARY SPECTRUM FRAGMENTS," the contents of which are incorporated herein by reference in their entirety.

TECHNICAL FIELD

In some implementations, the subject matter described herein relates to wireless communications processing, and in particular, to full-duplex signal shaping in communication systems.

BACKGROUND

Communication systems are essential to everyday life as they provide necessary connections between parties, devices, networks, and systems allowing vital exchange of information. Communication systems come in different varieties and can include optical communication systems, radio communication systems, powerline communication systems, duplex communication systems, and others. A duplex communication system is a point-to-point system that connects two parties or devices communicating with one another in both directions. An example of a duplex device is a telephone, which includes a speaker and a microphone and can be used to conduct a telephone call. The parties at both ends of the call can speak at the same time, where the speakers of the parties' telephones reproduce the sounds transmitted by the microphones of the other party telephone. Thus, duplex communication systems provide a "two-way street" between connected parties, as opposed to a "one-way street" in simplex communication systems where one device transmits and the other one listens (e.g., broadcast radio and television, garage door openers, baby monitors, wireless microphones, radio-controlled models, surveillance cameras, etc.).

A full-duplex ("FDX"), or sometimes double-duplex system, allows communication in both directions, and, unlike half-duplex, allows this to happen simultaneously. Land-line telephone networks are full-duplex, since they allow both callers to speak and be heard at the same time.

However, conventional full-duplex communication systems suffer from a variety of drawbacks, including an inability to simultaneously receive and transmit signals without reduction or elimination of interference and/or receiver saturation. These drawbacks can significantly reduce communication system's throughput and ability to provide fast and reliable service to consumers.

SUMMARY

In some implementations, the current subject matter relates to a system for processing signals. The system can include a transmitting antenna for transmitting a signal over a plurality of wireless spectrum fragments, a receiving antenna for receiving a signal from the plurality of wireless spectrum fragments, and a signal processing layer in communication with the transmitting and receiving antennas for simultaneously causing reception of the received signal and transmission of the transmitted signal. The signal processing layer can include an interference cancellation component for removing a first portion of interference from the received signal and a filtering component for removing a second portion of the interference from the received signal. The interference can be caused by the transmitted signal and affecting the received signal.

In some implementations, the current subject matter can include one or more of the following optional features. The portion of interference to be removed by the interference cancellation component can equal to a predetermined amount of power to be removed from the received signal. The predetermined amount of power can be determined based on at least one of the following: dynamic range of at least one of the received and transmitted signals, and a range of expected signal strength, the dynamic range of the received signal is determined based on a ratio of powers of a strongest received signal and a weakest received signal, the dynamic range of the transmitted signal is determined based on a ratio of powers of a strongest transmitted signal and a weakest transmitted signal, and the range of expected signal strength is determined based on a distance separating the transmitting antenna and a receiving antenna. The interference cancellation component can include a balanced-unbalanced transformer component for subtracting the predetermined amount of power from the received signal. In some implementations, the interference cancellation component can include at least one passive electronic component.

In some implementations, the filtering component can include a receiver circuitry for performing at least one of the following operations: sampling of the received signal, down-converting the sampled received signal into a narrowband stream, and filtering the down-converted signal to remove the second portion of the interference. The filtering component can include a transmitter circuitry for performing at least one of the following operations: up-converting of the transmitted signal and filtering the up-converted signal to prevent aliasing of the transmitted signal with at least another signal. The filtering component can include a plurality of filters arranged in a sequence for performing sampling and filtering of the received signal processed by the interference cancellation component to remove the second portion of the interference. The plurality of filters can include at least one programmable filter, which includes at least one of the following: a finite impulse response filter, an infinite impulse response filter, and a resampling filter. In some implementations, the filtering component can perform mapping of at least one signal received from at least one communication protocol layer to at least one frequency fragment in a wireless frequency band for transmission by the transmitting antenna.

The received signal and the transmitted signal can be in the wireless frequency band.

In some implementations, the current subject matter relates to a method for processing of signals using the above-referenced system. The method can include removing, using an interference cancellation component of the signal processing layer, a first portion of interference from the received signal and removing, using a filtering component of the signal processing layer, a second portion of the interference from the received signal.

The details of one or more variations of the subject matter described herein are set forth in the accompanying drawings and the description below. Other features and advantages of the subject matter described herein will be apparent from the description and drawings, and from the claims.

BRIEF DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
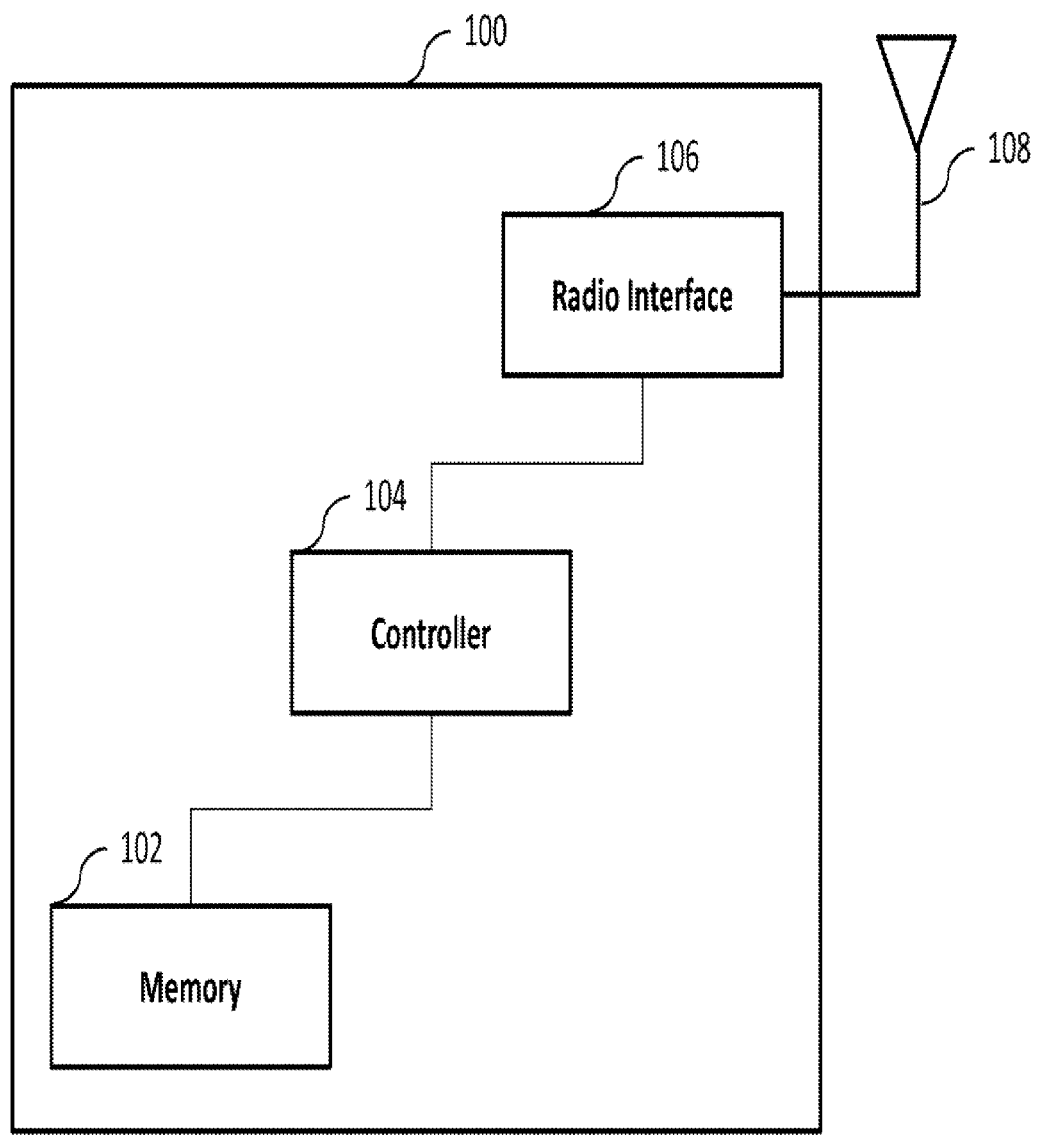
FIG. 1 illustrates an exemplary radio, such as a base station or an access point, according to some implementations of the current subject matter.

To address the above noted deficiencies of conventional communication systems, in some implementations, the current subject matter relates to a system for processing signals and, in particular, to a full-duplex signal shaping system. The system can include a transmitting antenna for transmitting a signal over a plurality of wireless spectrum fragments, a receiving antenna for receiving a signal from the plurality of wireless spectrum fragments, and a signal processing layer in communication with the transmitting and receiving antennas for simultaneously causing reception of the received signal and transmission of the transmitted signal. The signal processing layer can include an interference cancellation component for eliminating a portion of interference from the received signal. The interference can be caused by the transmitted signal and affect the received signal. The signal processing layer can also include a filtering component for programmatically removing remaining interference from the received signal. Thus, the current subject matter system is capable of simultaneous transmission and reception of signals substantially without interference affecting the transmitting and/or receiving antennas.

In conventional communications systems, simultaneous transmission and reception, even over different bands, cannot typically be achieved without some form of ancillary processing because the transmitted signal can be orders of magnitude stronger than the received signal. Specifically, if a radio has two antennas, one for transmit and one for receive, the transmit antenna signal can interfere and cause receiver saturation. For example, when the analog-to-digital converter ("ADC") samples the analog signal on the receive antenna, the ADC can convert each sample into a number corresponding to a voltage level. The value of each sampled point can be represented by a fixed length variable, which can have a size determined by the resolution, or dynamic range, of the ADC. If for example, the ADC has a resolution of n bits (e.g., n=12), then the ADC can only hold values from 0 to $2^{(n-1)}$. As such, the self-interference can typically be billions of times stronger than the received signal. Indeed, in the example case of WiFi™, the self-interference can be nearly 60-70 dB stronger than the received signal. The dynamic range of an ADC is typically not large enough to acquire the received signal in the face of such large self-interference, so the receiver can become saturated and the received signal is effectively "lost" in quantization. In addition, this saturation can occur even, when the transmitted signal are on a different spectrum fragment than received signal.

In some implementations, the subject matter system can enable a full-duplex communication over arbitrary spectrum fragments, so that simultaneous transmission and reception over different frequency channels can occur over the different frequency channels (which can arbitrary, e.g., not specified in advance and which can vary in time). In some implementations, the subject matter system can utilize a combination of mechanisms (e.g., analog circuitry and digital processes) to achieve full-duplex communication over a plurality of spectrum fragments (e.g., arbitrary portions of the spectrum fragments). To prevent receiver saturation, the current subject matter system can cancel the self-interference (e.g., between the transmission and the received), rather than filter the self-interference. In other words, the self-interference signal can be subtracted from the received signal, so that the self-interference is eliminated and, as such, receiver saturation may not occur.

In some implementations, the analog circuitry component the current subject matter system can provide sufficient cancellation to ensure that the receiver saturation does not take place. Moreover, the analog circuitry component of the current subject matter system can be configured so that it cannot leak any interference to adjacent spectrum fragments. For example, the analog circuitry can provide analog cancellation based on the use of passive components and/or the use of a balanced-unbalanced transformer ("balun") as a subtractor, as discussed below.

Active cancellation components can often cause interference leakage because these components can face power saturation and clip the signal. Hence, to avoid interference leakage, the current subject matter system can use passive components to avoid introducing distortion. While programmable passive attenuators are available off the shelf, passive delay lines are typically not. Nevertheless, because the active cancellation only needs, in some implementations, 20-25 dB of cancellation, the analog circuitry for analog cancellation can include a passive programmable attenuator and a simple wire whose length is statically matched roughly to the over-the-air delay for the transmitted signal.

Furthermore, instead of using the balun as a signal inversion technique (which typically introduces about a 3 dB power loss), the analog cancellation can implement a subtractor circuit some implementations. For example, a balun in a typical operational configuration takes an input signal on the unbalanced tap and produces two output signals that are inverses of each other on the balanced taps. The same operation can be modeled in reverse as taking two inputs on the balanced side and producing the subtraction of the input signals as the signal on the unbalanced side. Hence, if the two inputs of the balun are exact replicas of each other, the output of the balun will be a zero signal.

Self-interference cancellation can thus prevent the receiver ADC from saturating, but by itself, self-interference cancellation may not be sufficient to fully cancel out the interference between bands. But now with the ADC dynamic range no longer saturated, the subject matter described herein can provide systems which utilize programmable digital filters (also referred to as a filter engine) to digitally remove any remaining self-interference from the received signal. The filter engine can be configured to ensure that the transmitted, or received, signals are shaped according to, for example, a higher-layer specification defining which spectrum fragments to use for transmission/reception. At the receiver side, this can include converting the sampled wideband signal into narrowband streams by down converting and filtering to remove adjacent band interference. The reverse functionality is needed at the transmitter side, narrowband baseband streams have to be up converted and filtered to prevent aliasing.

In some implementations, a system can be provided which includes a self-interference cancellation circuitry block and a filtering engine. This combination can, in some implementations, enable full-duplex signal shaping.

In some implementations, there can be provided a system for full-duplex signal shaping by allowing radios to transmit and receive simultaneously on different, arbitrary channels that are not specified in advance. This can be used in a wide range of radios (e.g., mobile cellular devices, IEEE 802.22 white space devices, IEEE 802.15.4 sensor network nodes) and enable them to either replace several discrete components, such as duplexers, and operate on different channels of varying widths at different times.

In some implementations, there can be provided a centralized access points (e.g., cellular base station or WiFi™ access point) configured to provide full-duplex signal shaping, which would allow an access point to utilize varying amounts of spectrum to support different users. Also, because the ability to simultaneously transmit and receive across different fragments decouples the use of each fragment, different users can run different applications with varying latency requirements and not substantially affect one another.

In some implementations, full-duplex signal shaping can enhance routing protocols (e.g., wireless mesh networks). Full-duplex operation can reduce latency and the overhead associated with synchronizing all of the nodes to ensure that nodes do not attempt to transmit when they should be receiving a packet. Routing benefits created by full-duplex signal shaping can also be used to aggregate backhaul capacity (e.g., if one backhaul link is overloaded, the node could act as a router and offload the data it cannot support onto a node which has excess backhaul capacity).

Full-duplex signal shaping can, in some exemplary embodiments, be used in the context of peer-to-peer networks (e.g., WiFi Direct). Without full-duplex operation, one node cannot transmit to another node if it is already receiving from another node. Full-duplex signal shaping enables different peer-to-peer connections to operate independently and reduces the overhead associated with sending out beacons to announce availability to receive.

In some implementations, an advantage is that full-duplex signal shaping enables radios to cleanly separate the concern of utilizing fragmented spectrum from the design of higher physical/media access control ("PHY/MAC") layers. Existing methods for signal shaping (e.g., discontiguous orthogonal frequency division multiplexing ("OFDM")) do not allow for full-duplex and, as such, couple the usage of all spectrum fragments. By contrast, in some implementations of the system and methods described herein, every single spectrum fragment can be used for either transmit or receive.

Moreover, current methods and devices that enable full-duplex, filter the self-interference rather than cancelling the self-interference. These filters are typically designed with fixed analog components and operate over a pre-specified range of frequencies (e.g. notching out the transmitted signal in a particular range of pre-determined frequencies while allowing the received signal to pass through a different range of pre-determined frequencies). One of the advantages of the current subject matter system is that while different filter components are required to filter different frequency ranges, a single cancellation system can cancel the transmitted signal no matter what frequency ranges it is operating on. Thus, a single cancellation system could replace several discrete filtering components and allow for operation that is more flexible.

In some implementations, the current subject matter system can provide self-interference cancellation, as opposed to analog filtering, to enable simultaneous transmission and reception on different bands. For example, an analog self-interference cancellation might involve a single antenna utilizing a circulator (or isolator) to separate out the transmit and receive signals. It can also involve more than two antennas (e.g., 3 antennas, such as 2 transmit, 1 receive, and the 2 transmit antennas can be placed half of a wavelength apart from one another). A different digital cancellation system can implement filters, such as for example, Butterworth, Chebyshev, etc.

Figure 5:
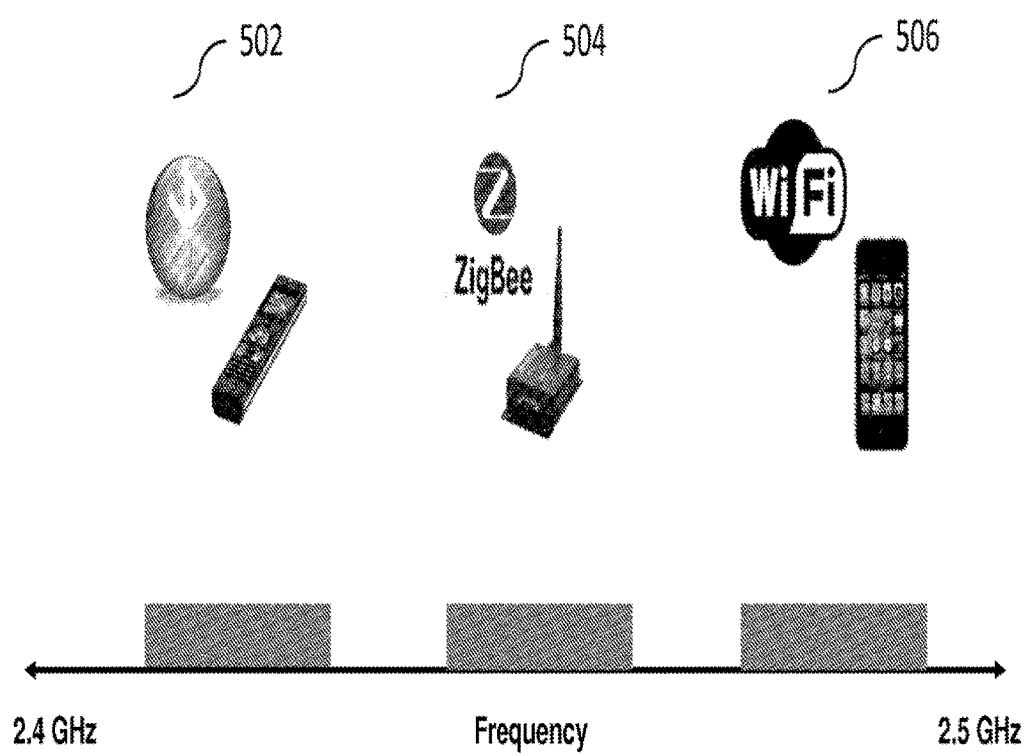
FIG. 5 illustrates exemplary radio devices configured to operate in different fragments of a wireless spectrum.

Many everyday devices, e.g., mobile phones, wireless local area networks ("LANs"), Bluetooth® enabled devices, ZigBeeA, small low-power digital radios, global positioning systems ("GPS"), two-way radios such as Land Mobile, FRS and GMRS radios, operate in a ultra-high frequency communication spectrum of 300-3000 MHz. Given the types of devices that operate in this band, this spectrum can become increasingly fragmented. The most common operational frequency for these devices is approximately 2.4 GHz, where these devices operate in an Industrial, Scientific, and Medical ("ISM") radio band (as established by first established at the International Telecommunications Conference of the International Telecommunications Union in 1947). In the unlicensed ISM band, it is not uncommon for users to carry multiple wireless devices (e.g., WiFi™ devices. Bluetooth® enabled devices, ZigBee® radios), where each device can operate in its own contiguous narrow band of varying widths. This can lead to fragmentation of the 2.4 GHz ISM band into various chunks (e.g., 100 MHz chunks). Spectrum fragmentation can vary over time and space, as the set of available ISM bands can depend on which devices are operating at a particular location at any given time. FIG. 5 illustrates a plurality of devices that can share a wireless spectrum and can operate on different fragments. The devices can include Bluetooth® enabled device 502, a ZigBee® radio 504, and a WiFi™ device 506. Other devices can share the wireless spectrum as well.

FIG. 1 illustrates an exemplary radio 100, such as a base station or access point, according to some implementations of the current subject matter. The radio 100 can include antenna(s) 108 configured to transmit via a downlink and configured to receive via an uplink. The radio 100 can include a radio interface 106 coupled to the antenna 108, and a controller 104 for controlling the radio 100 and for accessing and executing program code stored in memory 102. The radio interface 106 can include other components, such as filters, converters (e.g., digital-to-analog converters and the like), mappers, signal shaping components, a Fast Fourier Transform ("FFT") module, and the like, to generate symbols for a transmission via one or more downlinks and to receive symbols (e.g., via an uplink). In some implementations, the radio 100 can also be compatible with WiFi™, Bluetooth®, GSM EDGE Radio Access Network ("GERAN"), Universal Terrestrial Radio Access Network ("UTRAN"), and Evolved Universal Terrestrial Radio Access Network ("E-UTRAN"), and/or other standards and specifications as well. The radio 100 can be configured to perform one or more aspects of the subject matter described herein.

Figure 2:
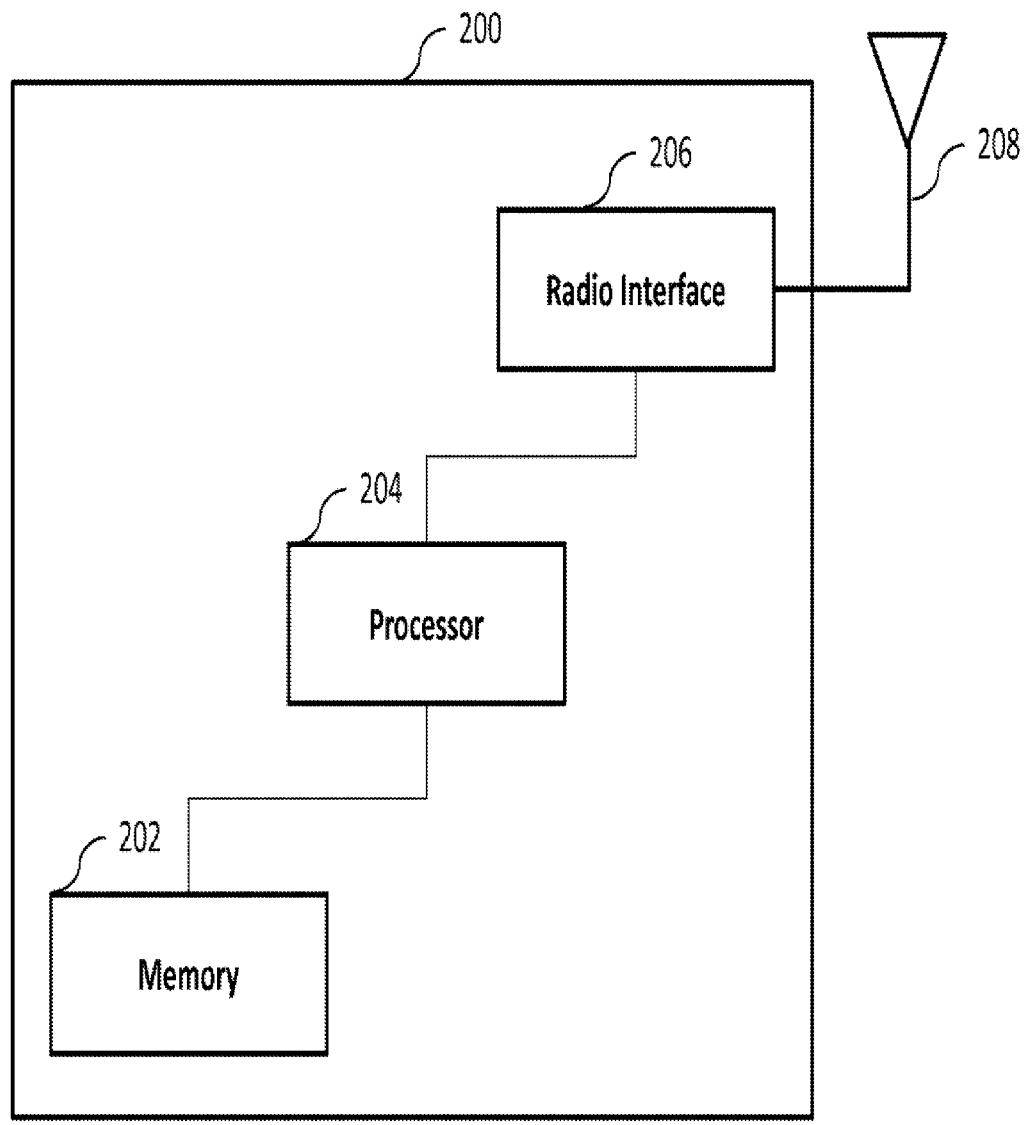
FIG. 2 illustrates an exemplary radio, such as a user equipment, according to some implementations of the current subject matter.

FIG. 2 illustrates another exemplary radio 200, such as a user equipment, according to some implementations of the current subject matter. The radio 200 can include an antenna 208 for receiving signals on a downlink and transmitting signals via an uplink. The radio 200 can also include a radio interface 206, which can include other components, such as filters, converters (e.g., digital-to-analog converters and the like), symbol demappers, signal shaping components, an Inverse Fast Fourier Transform ("IFFT") module, and the like, to process symbols, such as Orthogonal Frequency-Division Multiple Access ("OFDMA") symbols, carried by a downlink or an uplink. In some implementations, the radio 200 can also be compatible with WiFi™, Bluetooth®, GERAN, UTRAN, E-UTRAN, and/or other standards and specifications as well. The radio 200 can include at least one processor, such as processor 204, for controlling radio 200 and for accessing and executing program code stored in memory 202. The radio 200 can be configured to perform one or more aspects of the subject matter described herein.

Most conventional devices operate on contiguous spectrum bands and thus, are unable to take advantage of the fragmented spectrum. Some conventional devices include modified physical layers ("PHY") and media access control ("MAC") layers (also referred to as higher layers) so that they can operate on the fragmented spectrum. Such modifications include a wideband orthogonal frequency division multiplexing ("OFDM") PHY layer that uses only subcarriers that are in the empty spectrum fragments and a modified MAC layer to ensure that all available spectrum fragments are utilized fully. However, because conventional radios cannot transmit and receive simultaneously over arbitrary different bands, these devices cannot exploit fragmented spectrum without a significant complexity and still provide suboptimal performance. For example, if a radio device decides to use even one fragment to transmit on, then its only choice if it wants to use any of the other fragments is to transmit on them too and vice versa for receive. Consequently in order to maximize spectrum utilization among a set of nodes competing for fragmented spectrum, the MAC protocol has to dynamically estimate which node is sending to whom, and then coordinate nodes such that any transmitting node does not have any transmission intended for it at the same time, all while ensuring that all fragments are assigned for use. Inevitably, complexity of such distributed coordination grows, leading to inefficient spectrum utilization.

Functionalities of a communications system are governed by the Open Systems Interconnection ("OSI") model (ISO/IEC 7498-1), whereby functions of the communications system are grouped in terms of abstraction layers. There are seven layers in the OSI model, which include a physical layer ("PHY") that defines electrical and physical specifications for devices (e.g., it defines the relationship between a device and a transmission medium), a data link layer that provides functional and procedural means to transfer data between network entities and to detect and correct errors that occur in the physical layer (e.g., it can include the following functionalities/sub-layers: framing, physical addressing, flow control, error control, access control, and media access control ("MAC")), a network layer that provides functional and procedural means of transferring variable length data sequences from a source host on one network to a destination host on a different network while maintaining the quality of service requested by the transport layer, a transport layer that provides transparent transfer of data between end users, thereby providing reliable data transfer services to the upper layers, a session layer that controls connections between computers, establishes, manages and terminates connections between local and remote applications, provides for full-duplex, half-duplex, or simplex operation, and establishes checkpointing, adjournment, termination, and restart procedures, a presentation layer that establishes context between application-layer entities, in which the higher-layer entities use different syntax and semantics if the presentation service provides a mapping between them, and an application layer, which is the OSI layer closest to the end user, whereby the OSI application layer and the user interact directly with the software application.

Figure 3:
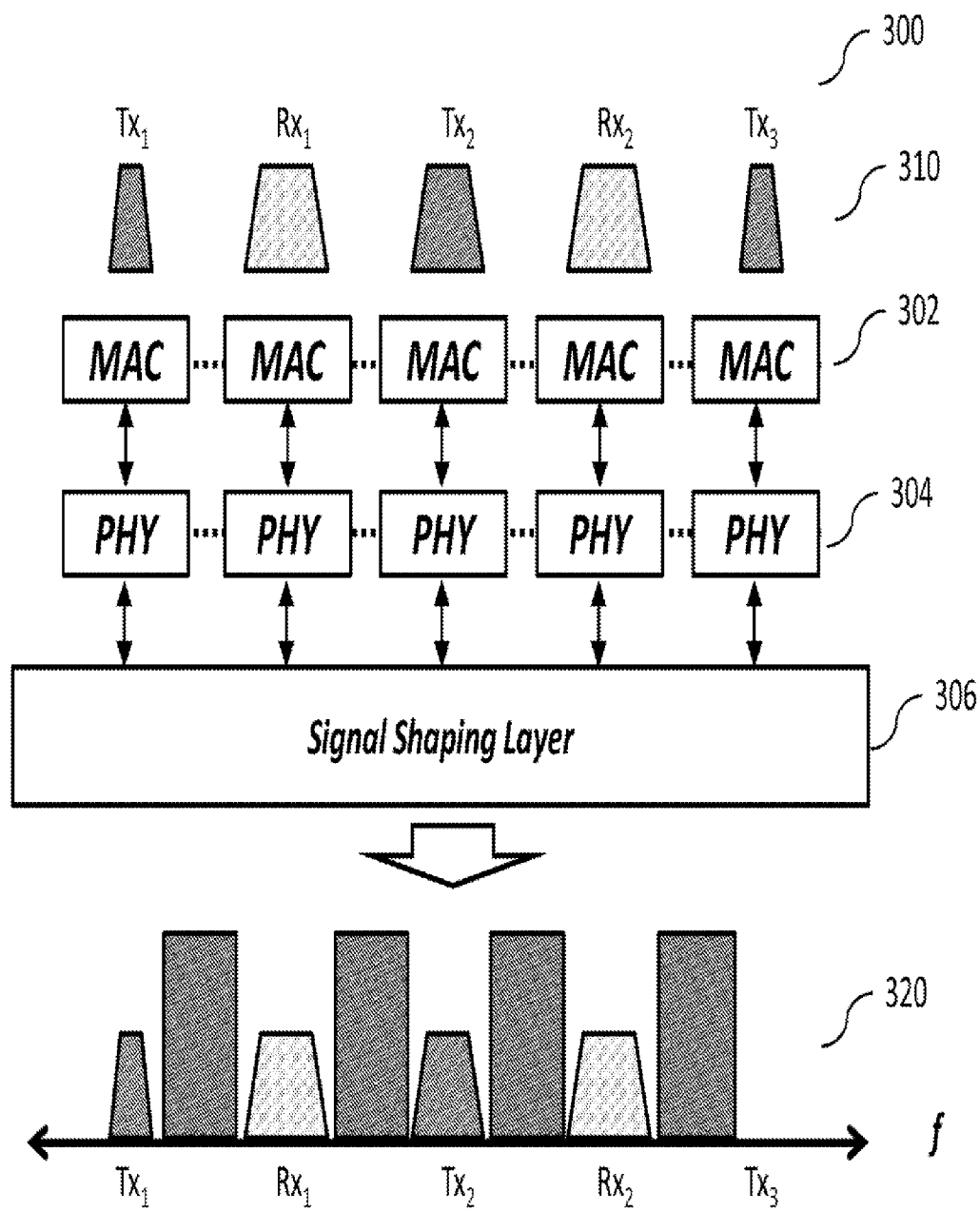
FIG. 3 illustrates an exemplary full-duplex communication system having a signal shaping layer, according to some implementations of the current subject matter.

FIG. 3 illustrates an exemplary implementation of the communication system 300, according to some implementations of the current subject matter. The system 300 can include a plurality of devices having respective transmitting and receiving antennas 310 (as shown in FIG. 3, Tx stands for transmitting antennas and Rx stands for receiving antennas, where "1" designates device 1; "2" designates device 2, etc.). The antennas can communicate with MAC layer 502 and PHY layer 504. The system 300 can also include a signal shaping layer 506 coupled to the layers 502 and 504 and configured to provide process and provide signals to the layers 502 and 504, as described below in connection with FIG. 4.

In some implementations, the current subject matter provides a full-duplex signal shaping capability to the higher layers (e.g., PHY, MAC, etc.) to use fragmented spectrum. A full-duplex signal shaping can include transmitting on an arbitrary set of spectrum fragments of the wireless spectrum and receiving on a different arbitrary set of spectrum fragments of the wireless spectrum. If necessary, the transmitting and receiving can be performed simultaneously. Thus, the current subject matter system can decouple use of different spectrum fragments, i.e., instead of having one complex wideband PHY and MAC protocol that operates over the entire fragmented spectrum, the system can run several independent, contiguous narrowband PHY and MAC instances on each spectrum fragment. Hence, the current subject matter system's signal shaping can preserve design modularity and enable reuse of higher layers of a communication system.

In some implementations, the current subject matter relates to a system and a method for providing high performance full-duplex signal shaping signals in communication devices. An exemplary communication device can include a receiver circuitry that can receive signals transmitted by another communication device, a transmitter circuitry that can transmit signals for reception by another communication device, and various processing circuitry that can process received signals, prepare signals for transmission, and/or perform various other functions. An exemplary communication device can include a mobile telephone, a Bluetooth® enabled device, a ZigBee® small low-power digital radio, a GPS device, a two-way radio, such as Land Mobile, Family Radio Service ("FRS") and General Mobile Radio Service ("GMRS") radios, and/or any other devices. The current subject matter system can perform at least one of the following functions: a full-duplex operation and a dynamic signal shaping. The following is a brief discussion of each of these functions.

In some implementations, during the full-duplex operation a signal shaping radio device can allow higher layers (e.g., PHY, MAC, etc.) of the communication device to simultaneously transmit and receive on arbitrary but different sets of spectrum fragments of the wireless spectrum. The current subject matter system can resolve receiver saturation during such simultaneous receive/transmit operations. Receiver saturation refers to self-interference that saturates the receive circuit's analog-to-digital converter circuitry and zeroes out the received signal, during transmission by the transmitter circuitry even if the reception is on a different band.

In some implementations, the current subject matter can include a programmable digital filter to shaped signals in order to fit spectrum fragments that are available for the purposes of dynamic signal shaping functionality. This can account for the dynamic nature of the available spectrum fragments as well as their ability to change over time.

Figure 4:
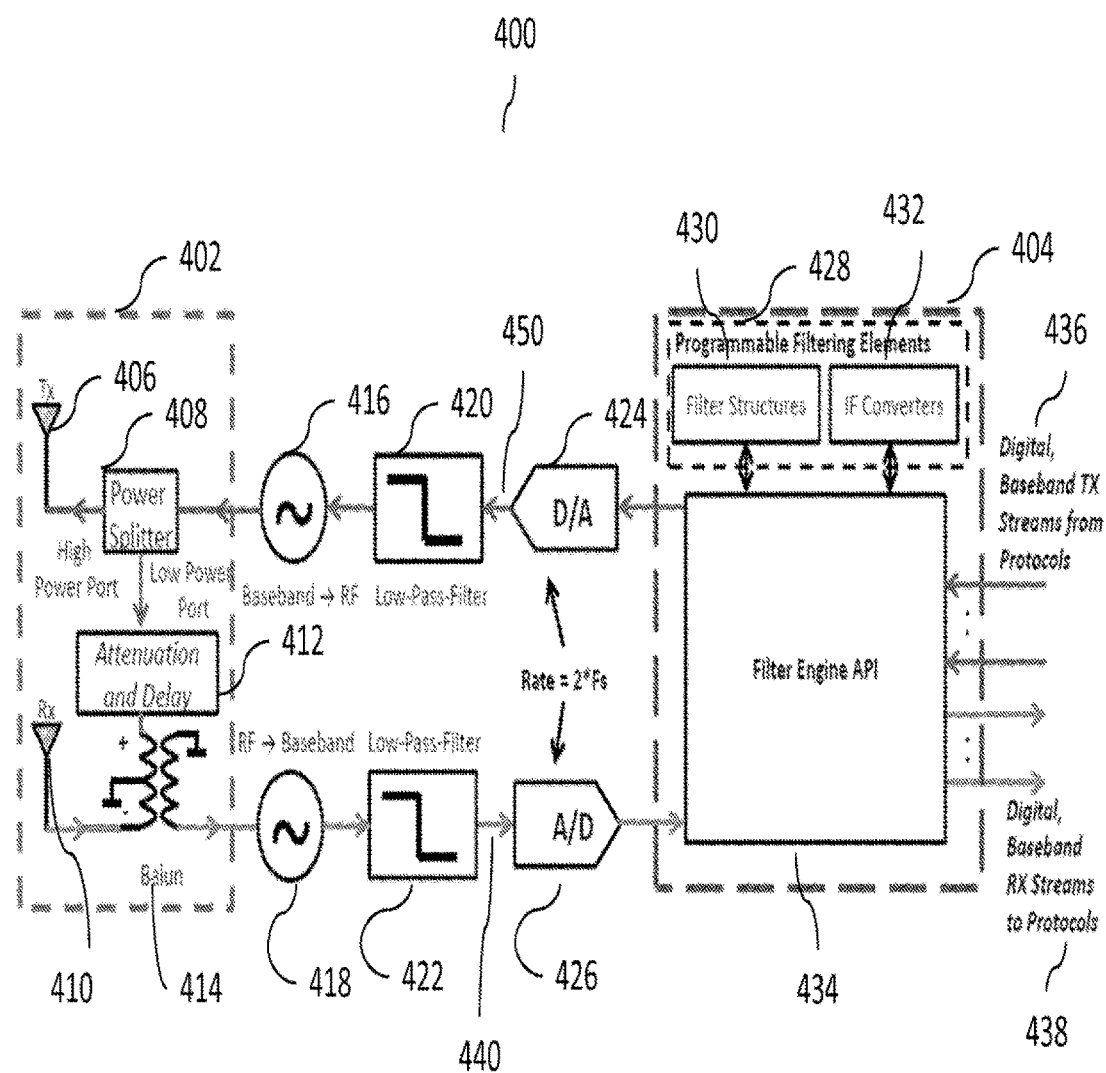
FIG. 4 illustrates an exemplary full-duplex signal shaping system, according to some implementations of the current subject matter.

In some implementations to enable full-duplex operation on separate bands, the current subject matter can include a self-interference cancellation mechanism that can reduce an amount of self-interference and ensure that an analog-to-digital converter in the receive circuitry (as shown in FIG. 4 and discussed below) is not saturated. The self-interference cancellation mechanism does not leak interference into adjacent bands and does not hurt receive performance. It can include a reconfigurable filter engine that can provide efficient and programmable digital filtering, as discussed below with regard to FIG. 4.

FIG. 4 illustrates an exemplary full-duplex signal shaping system 400, according to some implementations of the current subject matter. The system 400 can be implemented in a communications device, such as those referenced above. The system 400 can be implemented in a stand-alone device and/or a communications network.

The system 400 can include a self-interference cancellation component 402 and a filter engine component 404. The system 400 can include a receiver antenna or component ("Rx") 406 and a transmitter antenna or component ("Tx") 410. The components 402 and 404 can be part of the self-interference cancellation component 402 circuitry. The component 402 can include a power splitter 408 that can include a high power port and a low power port, where the high power port of the power splitter 408 can be coupled to the transmitter antenna 406 and the low power port can be coupled to an attenuation and delay circuitry 412. The power splitter 408 can be a passive device that can couple a defined amount of the electromagnetic power in a transmission line to a port enabling the signal to be used in another circuit. The splitter 408 can couple power flowing in one direction, whereby power entering the output port can be coupled to an isolated port but not to the coupled port. In an exemplary embodiment, the power splitter 408 can be an 8 dB power splitter that can be used to obtain a reference signal and reduce the transmit power by 8 dB. The circuitry 412 can be coupled to a balun transformer circuitry 414. A balun can be an electrical device that can convert between a balanced signal (two signals working against each other, where ground is irrelevant) and an unbalanced signal (a single signal working against a ground or a pseudo-ground). A balun can take many forms and can include devices that transform impedances but need not do so, where transformer baluns can be used to connect lines of differing impedance. In this case, the balun 414 can be used as a subtractor circuit, where the transmitted signal does not suffer a power loss (e.g., 3 dB power loss). This is contrary to conventional systems, where baluns are used as inverters, resulting in a power loss (e.g., 3 dB power loss). In the conventional systems, transmit antenna transmits a positive signal and to cancel self-interference, the radio combines a negative signal with its received signal after adjusting the delay and attenuation of the negative signal to match the self-interference.

The filter engine 404 can include programmable filtering elements 428 that can include various filtering structures 430 and intermediate frequency converters 432. The filter engine 404 can also include a filter engine application programming interface ("API") 434.

The self-interference cancellation circuitry 402 can be coupled to the filter engine 404 circuitry via at least one receive line 440 and at least one transmit line 450. The receive line 440 can be coupled to the receive antenna 410 via the balun transformer 414. It can process a received radio frequency ("RF") signal through a power source 418 that converts RF signal to a baseband signal. The baseband signal can be filtered through a low-pass filter 422 and passed onto an analog-to-digital converter ("ADC") 426. The ADC 426 can sample the received signal at a predetermined sampling frequency and pass it onto to the filter engine 404. The engine 404 can filter the signal and output it as digital baseband Rx signal to protocol layers. The transmit line 450 can be coupled to the transmit antenna 406 via the power splitter 408 and can perform functions similar to those performed during signal processing on the receive line 440 but in a reverse order as follows. The filter engine 404 can pass a filtered digital baseband Tx signal from protocol layers to a digital-to-analog converter ("DAC") 424. The DAC 424 can resample the signal and pass it to a low pass filter 420, which can apply it to a power source 416 to generate a transmission RF signal from the baseband signal for transmission by the transmit antenna 406.

In some implementations, the current subject matter system can achieve full-duplex operation over different but arbitrary spectrum fragments by cancelling self-interference in analog instead of filtering it. The self-interference signal can be subtracted from the received signal so that its effect is eliminated and receiver saturation does not occur. This can be accomplished by using the balun transformer 414. The current subject matter system can also determine how much cancellation is needed to ensure receiver saturation does not occur. The amount of cancellation needed can be determined based on at least the following two factors: (1) dynamic range/resolution of ADC 426; and (2) range of signal strengths that are expected.

Dynamic range ("DR") is defined as the ratio between largest and smallest possible values of a variable of interest. At the transmitter, the dynamic range of the DAC can determine the maximum ratio between the powers of the strongest and weakest transmissions. At the receiver, the ADC's dynamic range can define the maximum ratio between the strongest and weakest received signal power. When the dynamic range is exceeded, the converter's quantization noise can bury the weaker signals. The dynamic range of the ADC can be calculated through the following formula:

$$\text{DR (dB)} = 6.02 \times n + 1.76 \text{ dB} \quad (1)$$

where n is the number of bits in the DAC/ADC resolution. Higher dynamic ranges can equate with better performance. In some implementations, the current subject matter system can use a 12-bit DAC/ADCs which can provide about 74 dB of dynamic range.

At the transmitter, the maximum ratio between transmit powers over different fragments will rarely exceed 30 dB so DAC dynamic range is usually not a concern. On the other hand, if the transmitter is operating while the system attempts to receive, the dynamic range of the ADC at the receiver can be critical because the transmitted signal can be much stronger than the received signal. To determine the required ADC dynamic range, the range of expected signal strengths can be calculated. Assuming that the transmit and receive antennas are reasonably separated, the attenuation between the two due to path loss can be calculated as follows:

$$\text{Path Loss (dB)} = 36.56 + 20 \log_{10}(f) + 20 \log_{10}(d) \qquad (2)$$

where f is the carrier frequency in MHz and d is the distance in miles. Assuming that the transmit and receive antennas are separated by 10 cm, the path loss between transmitter and receiver can be approximately 23 dB, which can be a maximum output from a WiFi 2.4 GHz antenna. Because a typical thermal noise-floor for WiFi systems is approximately −95 dBm, the power of the weakest decodable signal is −90 dBm (according to IEEE 802.11 standard, the lowest signal-to-noise ratio is approximately 5 dB).

Thus, the amplitude of the self-interference signal at the receiver is 0 dBm (assuming 23 dBm transmit power, the maximum in WiFi). Thus, ADC 426 can require 90 dB (0−(−90)) in dynamic range in order to simultaneously transmit and receive. In some implementations, the amount of cancellation required can increase as ADC resolution drops.

In some implementations, the current subject matter system's self-interference cancellation mechanism can provide sufficient cancellation to ensure receive saturation does not take place, does not leak any interference to adjacent spectrum fragments, and does not cause signal power loss for the transmitted signal.

In some implementations, to avoid interference leakage, passive components that do not introduce distortion can be used in the current subject matter system (such as the one shown in FIG. 4). The current subject matter system can provide for cancellation of a certain amount of signal power (e.g., 20-25 dB of cancellation compared to the 35 dB required for single-channel full-duplex). Hence, precise delay matching with the over-the-air transmitted signal may not be needed, an almost good delay-match might suffice. Further, as stated above, a balun transformer can be used as a subtractor circuit, as shown in FIG. 4. The balun transformer, in typical operation, can take an input signal on the unbalanced tap and produce two output signals which can be inverses of each other on the balanced taps. The same operation can be modeled in reverse as taking two inputs on the balanced side and producing the subtraction of the input signals as the signal on the unbalanced side. Hence, if the two inputs are exact replicas of each other, the output will be a zero signal.

In some implementations, the self-interference cancellation can prevent the receiver ADC from saturating, but by itself, it can be insufficient to fully cancel out the interference between bands. However, with the ADC dynamic range no longer saturated, the current subject matter system can utilize programmable digital filters of the filter engine 404 shown in FIG. 4 to digitally remove the remaining self-interference from the received signal for programmatically shaping the signal at the transmit and receive antennas.

The filter engine 404 can ensure that the transmitted and/or received signals are shaped according to the higher layer specification of which spectrum fragments to use. At the receiver side, the sampled wideband signal can be converted into narrowband streams by down-converting and filtering to remove adjacent band interference. The reverse functionality can be performed at the transmitter side, where narrowband baseband streams can be up-converted and filtered to prevent aliasing (i.e., an effect that causes different signals to become indistinguishable (or aliases of one another) when sampled.

The filter engine 404 can include the ADC 426 and DAC 424, both of which can be capable of operating at a predetermined Nyquist rate (e.g., which can be the required Nyquist rate to create signals that span the entire 100 MHz ISM band). Further, on the analog RF side, there is a single oscillator at 2.45 GHz which can up-convert the shaped signal to the ISM band. The filter engine 404 can perform the following tasks to shape the signals for transmission: resampling, filtering, and mapping of signal streams.

For resampling, since the DAC 424 expects an input signal at the predetermined Nyquist rate (e.g., 200 MS/s), the digital baseband transmission streams 436 can be up-sampled (e.g., 40 Msamples/sec streams can be up-sampled to 200 Msamples/sec). To accomplish this, the up-sampler can interpolate (i.e., insert extra samples) to reach the predetermined Nyquist rate (e.g., 200 MS/s).

For filtering, the filter engine can low-pass filter both up-sampled streams to remove any undesirable aliasing effects generated by the resampling and retain only the up-sampled-baseband version of each stream.

Subsequent to resampling and filtering, the filter engine can perform a mapping operation. For mapping, the filter engine 404 can process two 200 MS/s streams each occupying 20 MHz at a center frequency. The filter engine 404 can move the 20 MHz frequencies to the specified fragments in the 100 MHz band, i.e., to −38 MHz and 22 MHz, respectively (corresponding to 2.4120 GHz and 2.4720 GHz at a center frequency of 2.450 GHz). The signal streams can be added together and sent to the DAC 424. After that, the signal streams can be up-converted to the carrier frequency of 2.45 GHz and transmitted over the air.

As stated above, the filter engine 404 can include filter structures 430, intermediate frequency converters 432, and filter engine application programming interface ("API") 434. The filter structures 430 can include a collection of configurable programmable filters. The filters can include at least one of the following: a finite impulse response ("FIR") filter (which is a filter whose impulse response (or response to any finite length input) is of finite duration and settles to zero in finite time), an infinite impulse response ("IIR") filter (which is a filter that has an impulse response function that is non-zero over an infinite length of time), a resampling filter, and/or any other filters. The filters in the filter structures 430 can be configured and sequenced to provide resampling and filtering functionalities discussed above.

The intermediate frequency converters 432 can map the signal from an incoming digital baseband 436 to a digital intermediate frequency ("IF"), and provide mapping functionality.

The filter engine API 434 can act as a substrate that can allow programmable interconnection of the filter structures 430 and IF converter 432 to obtain the desired signal shaping. The API 434 can configure the filters, up/down samplers, and digital up-/down-converters. It can also coordinate movement of signal streams across these elements. It can collect all of the input signal streams 436, add them, and send the final stream to the DAC 424. The analog output of the DAC 424 can be upconverted to a 2.45 GHz signal frequency and transmitted by the transmission antenna 406. For the receiving shaped signals, the API 434 can perform the above process but in a reverse manner. Thus, by performing the above operations, the current subject matter system's self-interference cancellation component 402 and the filtering engine component 404 can perform full-duplex signal shaping.

Figure 6:
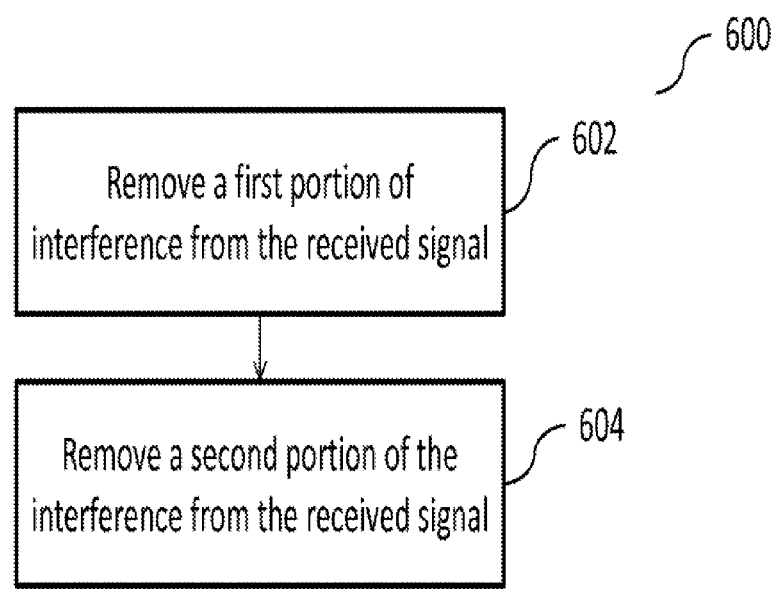
FIG. 6 illustrates an exemplary method for full-duplex signal shaping, according to some implementations of the current subject matter.

FIG. 6 illustrates an exemplary method 600 for performing a full-duplex signal shaping that can be performed by the system 400 (shown in FIG. 4), according to some implementations of the current subject matter. As stated above, the system that can perform the method 600 can include the transmitting antenna 406 for transmitting a signal over a plurality of wireless spectrum fragments, the receiving antenna 410 for receiving a signal from the plurality of wireless spectrum fragments, and the signal processing layer 306 (as shown in FIG. 3) in communication with the transmitting and receiving antennas. The system can be used for simultaneously causing reception of the received signal and transmission of the transmitted signal.

At 602, a portion of interference from the received signal can be removed or cancelled. The interference can be caused by the transmitted signal and affect the received signal. It can be cancelled using the interference cancellation component 402 (shown in FIG. 4) of the signal processing layer. As discussed above, the interference cancellation component can include a balun transformer that can subtract a certain amount of power from the signal to reduce interference. The amount of power to be deducted can be determined based on a various characteristics associated with the system as well as the received/transmitted signals.

At 604, a remaining portion of the interference can be removed from the received signal. This can be accomplished using the filtering component or filter engine 404 (shown in FIG. 4) of the signal processing layer.

In some implementations, the portion of the interference to be cancelled by the interference cancellation component can equal to a predetermined amount of power to be removed from the received signal. The predetermined amount of power can be determined based on at least one of the following: dynamic range of at least one of the received and transmitted signals, and a range of expected signal strength. The dynamic range of the received signal can be determined based on a ratio of powers of a strongest received signal and a weakest received signal. The dynamic range of the transmitted signal can be determined based on a ratio of powers of a strongest transmitted signal and a weakest transmitted signal. The range of expected signal strength can be determined based on a distance separating the transmitting antenna and a receiving antenna.

In some implementations, the interference cancellation component can include a balanced-unbalanced transformer component for subtracting the predetermined amount of power from the received signal. The interference cancellation component can include at least one passive electronic component.

In some implementations, the filtering component can include a receiver circuitry for performing at least one of the following operations sampling of the received signal, down-converting the sampled received signal into a narrowband stream, and filtering the down-converted signal to remove the second portion of the interference. The filtering component can also include a transmitter circuitry for performing at least one of the following operations up-converting of the transmitted signal and filtering the up-converted signal to prevent aliasing of the transmitted signal with at least another signal. Further, the filtering component can include a plurality of filters arranged in a sequence for performing sampling and filtering of the received signal processed by the interference cancellation component to remove the second portion of the interference. The plurality of filters can include at least one programmable filter, which includes at least one of the following: a finite impulse response filter, an infinite impulse response filter, and a resampling filter.

In some implementations, the filtering component can perform mapping of at least one signal received from at least one communication protocol layer to at least one frequency fragment in a wireless frequency band for transmission by the transmitting antenna.

The received signal and the transmitted signal can be in the wireless frequency band.

The following is a brief discussion of an exemplary experimental implementation of the current subject matter system 400. The below discussion is not to be construed as limiting the scope of the current subject matter system and/or any of its components in any way. It is provided here for purely illustrative purposes.

EXEMPLARY EXPERIMENTAL IMPLEMENTATION

The current subject matter system 400 was experimentally implemented using a Virtex-5 LX30 field-programmable gate array ("FPGA") (which is an integrated circuit designed to be configured by a customer after manufacturing) based software radios available from National Instruments Corporation, Austin, Tex., USA. The FPGA used had a total of 19,200 basic LUT-FF and 32 DSP48E arithmetic unit resources. The FPGA was connected to an NI5781 baseband transceiver (also available from National Instruments Corporation, Austin, Tex., USA), which served as both the ADC and the DAC. The NI5781 was operated at 100 MS/s for both the in-phase and quadrature components, allowing the current subject matter system to cover approximately 100 MHz of total bandwidth and provide signal shaping over almost the entire 2.4 GHz ISM band. The NI5781 baseband transceiver included quadrature 100 MS/s 12-bit ADCs and 100 MS/s 16-bit DACs and provided approximately 86 dB of dynamic range at the receiver. The converter was attached to the interposer board through differential connections, which formatted the signals for the XCVR2540 high-performance transceiver operating in the 2.4 GHz range (also available from National Instruments Corporation, Austin, Tex., USA).

The XCVR2450 performed the analog down conversion to baseband and the bandwidth and receiver gain were controllable from the NI PXIe-8133 RT Module (also available from National Instruments Corporation, Austin. Tex., USA). Because the XCVR2450 operated in the ISM band, there were several sources of external interference which came from devices such as WiFi, Bluetooth, wireless devices, etc.

The experimental system was connected to the two XCVR2450 daughter cards, with the received signal wires connecting to one card and the transmit signal wires connecting to the other. The signal from the transmit daughter card was first passed through an 8 dB power splitter and the high power port output was fed to the transmitter antenna. The low power port output was fed into a programmable attenuator line, which was then connected to one end of the balanced tap of the balun. The signal from the received antenna was directly connected to the other balanced tap and the unbalanced output of the balun, which was the subtraction of the two input signals, was connected to the receiver daughter card. The two antennas, one for transmit and one for receive, were placed within 10 cm of one another.

A programmable attenuator of the experimental system's self-interference cancellation block was tuned once, for a particular transmit power and location of the node. After, the block was static, thereby making it a passive component. While channel fluctuations caused the amount of self-interference to vary slightly, the mean cancellation was determined to be around 25 dB. Because the experimental system's self-interference cancellation component did not require an active component, it provided flat cancellation.

The filter engine hardware used in the experimental system included an NI PXIe-7695 FPGA and a real-time processor NI PXIe-8133 RT Module (also available from National Instruments Corporation, Austin, Tex., USA). The FPGA was directly connected to the ADC/DAC (NI 5781 Adapter Module) and received baseband sample at a rate of 100 complex MS/s. The FPGA was then connected to the real-time processor, which controlled the FPGA resources via the filter engine API.

The FPGA was a Virtex-5 95T, with 14,720 slices and nearly 9 Mb of random access memory ("RAM"). The slices were used for almost every operation on the FPGA, while the RAM use was limited to storing data while averaging and providing temporary storage when restructuring the output of the definition of FFTs from bit order to natural order. For the filter structures, DSP48E slices available on the Xilinx LX30 were utilized. Each of these slices is a highly configurable arithmetic logic unit which feature pipelined multiplier, adder and accumulator stages and can be clocked at up to 550 MHz. Slices can be individually programmed and/or cascaded to implement FIR, IIR, and resampling filtering with relative ease.

The IF converters were implemented using the standard Coordinate Rotation Digital Computer ("CORDIC") algorithm, which is an algorithm to calculate hyperbolic and trigonometric functions, and a complex multiplier. In total, each IF converter requires approximately 1100 LUT-FF resources and 3 DSP48E slices, and can be clocked at up to 300 MHz. Based upon stream requirements, both the CORDICs and DSP48E slices can be time-division multiplexed to support multiple streams. The experimental system had 10 filter structures (10 DSP48E slices) and 3 IF converters (9 DSP48E slices and 3300 LUT-FFs). Thus, the overall resource consumption on an off-the-shelf, mid-range FPGA was around 15% of the hardware resources.

The NI PXIe-8133 RT Module operates with four 1.733-GHz cores, which were capable of dynamically splitting tasks between two threads each, giving the RT module a total of 8 processing threads. These threads were utilized to implement the filter engine API, channel estimation, frequency offset information, and symbol decoding. The filter engine API allowed specifying which fragments to transmit and receive over along with the desired bandwidths of each fragment. The filter engine then configured the filter structures, IF converters, and fractional resamplers to fit the user specifications.

In the experimental system, a WiFi style OFDM PHY and a carrier sense multiple access ("CSMA") MAC on the realtime operating system ("OS") were implemented. The OFDM PHY was configured to operate over different bandwidths (from 20 MHz to 5 MHz), and ran in realtime on the SDR platform. It supported all WiFi constellations (from BPSK to 64-QAM) as well as channel coding rates (½, ⅔, ¾ convolutional coding).

During experimental operation, the above experimental system achieved more than 24 dBm self-interference cancellation. The system achieved the same throughput over multiple links as multiple independent radio devices receiving multiple signal streams. Further, as compared to conventional active cancellation systems that introduce sideband leakage thereby reducing system throughput, the experimental system produced near optimal throughput.

In some implementations, the current subject matter system can be implemented in access point networks, cellular networks, WiFi direct networks, and/or any other networks.

In access point networks, signals can be shaped to avoid interferences and latency for multiple clients can be appropriately mitigated. The current subject matter system can provide nearly three times throughput increase. The current subject matter system can improve throughput because the PHY/MAC instance on each spectrum fragment can be decoupled from the others. In the current subject matter system, each spectrum fragment behaves as if it is an independent WiFi network and no client has to be blocked because a client on some other spectrum fragment is being serviced. Thus, the current subject matter system can improve overall spectrum utilization and network throughput. The current subject matter system further can improve latency and provide a better quality of service.

In the WiFi-Direct ("WD") networks that are used for peer-to-peer connectivity between gadgets, the current subject matter system can enable a device to connect to an access point and to the WD peer on separate spectrum fragments and completely decouple their operation. The device can be transmitting, receiving or both on any combination of the two networks, it does not have to worry about synchronized scheduling, thereby simplifying the design of the WD networks.

The subject matter described herein may be embodied in systems, apparatus, methods, and/or articles depending on the desired configuration. In particular, various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, applications, components, or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal.

Similarly, systems are also described herein that may include a processor and a memory coupled to the processor.

The memory may include one or more programs that cause the processor to perform one or more of the operations described herein.

Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

As used herein, the term "user" can refer to any entity including a person or a computer.

Although ordinal numbers such as first, second, and the like can, in some situations, relate to an order, as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A system for processing signals, comprising:
a transmitter that transmits an RF transmit signal;
a receiver that receives an RF receive signal; wherein transmission of the RF transmit signal and reception of the RF receive signal occur simultaneously;
an interference cancellation component that samples the RF transmit signal and transforms the sampled RF transmit signal into a self-interference cancellation signal; wherein the self-interference cancellation signal is combined with the RF receive signal to remove a first portion of interference from the RF receive signal, said combination forming a processed RF signal; and
a filtering component that removes a second portion of interference from the processed signal by:
downconverting the processed RF signal to a processed baseband signal,
sampling, at a first sample rate, the processed baseband signal at an analog-to-digital converter to create a processed digital signal, and
filtering the processed digital signal to remove the second portion of interference;
wherein removal of the first portion of interference results in prevention of receiver saturation at the filtering component.

2. The system of claim 1, wherein the first portion of interference is larger than a dynamic range of the analog-to-digital converter.

3. The system of claim 1, wherein the interference cancellation component is configured to remove at least a predetermined amount of power from the RF receive signal through combination of the RF receive signal with the self-interference cancellation signal.

4. The system of claim 3, wherein the predetermined amount of power is set according to a dynamic range of the RF transmit signal.

5. The system of claim 3, wherein the predetermined amount of power is set according to a dynamic range of the RF receive signal.

6. The system of claim 3, wherein the predetermined amount of power is set according to a range of expected signal strength.

7. A method for processing signals, comprising:
transmitting an RF transmit signal;
receiving an RF receive signal; wherein transmission of the RF transmit signal and reception of the RF receive signal occur simultaneously;
sampling the RF transmit signal;
transforming the sampled RF transmit signal into a self-interference cancellation signal;
combining the self-interference cancellation signal with the RF receive signal to remove a first portion of interference from the RF receive signal, said combination forming a processed RF signal;
downconverting the processed RF signal to a processed baseband signal;
sampling, at a first sample rate, the processed baseband signal at an analog-to-digital converter to create a processed digital signal; and
filtering the processed digital signal to remove a second portion of interference;
further comprising resampling the processed digital signal from the first sample rate to a second sample rate; wherein the second sample rate is higher than the first sample rate.

8. The method of claim 7, wherein downconverting the processed RF signal comprises downconverting the processed RF signal into a narrowband stream.

9. The method of claim 7, wherein removal of the first portion of interference results in prevention of receiver saturation; wherein the first portion of interference is larger than a dynamic range of the analog-to-digital converter.

10. The method of claim 7, wherein transforming the sampled RF transmit signal into a self-interference cancellation signal comprises transforming the sampled RF transmit signal such that, when combined with the RF receive signal, the self-interference cancellation signal enables removal of at least a predetermined amount of power from the RF receive signal.

11. The method of claim 10, wherein the predetermined amount of power is set according to at least one of:
a dynamic range of the RF transmit signal;
a dynamic range of the RF receive signal; and
a range of expected signal strength.

12. The method of claim 7, wherein resampling the processed digital signal comprises resampling the processed digital signal prior to filtering the processed digital signal.

13. The method of claim 12, further comprising filtering the processed digital signal to remove aliasing resulting from resampling.

14. The method of claim 7, further comprising performing mapping of a digital transmit signal, using a digital intermediate frequency converter, to a frequency fragment in a wireless frequency band for transmission; further comprising converting the mapped digital transmit signal into the RF transmit signal.

15. A system for processing signals, comprising:
a transmitter that transmits an RF transmit signal;
a receiver that receives an RF receive signal; wherein transmission of the RF transmit signal and reception of the RF receive signal occur simultaneously;
an interference cancellation component that samples the RF transmit signal and transforms the sampled RF transmit signal into a self-interference cancellation signal; wherein the self-interference cancellation signal is combined with the RF receive signal to remove a first portion of interference from the RF receive signal, said combination forming a processed RF signal; and
a filtering component that removes a second portion of interference from the processed signal by:
downconverting the processed RF signal to a processed baseband signal,
sampling, at a first sample rate, the processed baseband signal at an analog-to-digital converter to create a processed digital signal, and
filtering the processed digital signal to remove the second portion of interference;
wherein downconverting the processed RF signal comprises downconverting the processed RF signal into a narrowband stream.

16. A system for processing signals, comprising:
a transmitter that transmits an RF transmit signal;
a receiver that receives an RF receive signal; wherein transmission of the RF transmit signal and reception of the RF receive signal occur simultaneously;
an interference cancellation component that samples the RF transmit signal and transforms the sampled RF transmit signal into a self-interference cancellation signal; wherein the self-interference cancellation signal is combined with the RF receive signal to remove a first portion of interference from the RF receive signal, said combination forming a processed RF signal; and
a filtering component that removes a second portion of interference from the processed signal by:
downconverting the processed RF signal to a processed baseband signal,
sampling, at a first sample rate, the processed baseband signal at an analog-to-digital converter to create a processed digital signal, and
filtering the processed digital signal to remove the second portion of interference;
wherein the filtering component resamples the processed digital signal from the first sample rate to a second sample rate; wherein the second sample rate is higher than the first sample rate.

17. The system of claim 16, wherein the filtering component resamples the processed digital signal prior to filtering the processed digital signal.

18. The system of claim 16, wherein the filtering component further comprises an anti-aliasing filter that removes aliasing from the processed digital signal after resampling.

19. A system for processing signals, comprising:
a transmitter that transmits an RF transmit signal;
a receiver that receives an RF receive signal; wherein transmission of the RF transmit signal and reception of the RF receive signal occur simultaneously;
an interference cancellation component that samples the RF transmit signal and transforms the sampled RF transmit signal into a self-interference cancellation signal; wherein the self-interference cancellation signal is combined with the RF receive signal to remove a first portion of interference from the RF receive signal, said combination forming a processed RF signal; and
a filtering component that removes a second portion of interference from the processed signal by:
downconverting the processed RF signal to a processed baseband signal,
sampling, at a first sample rate, the processed baseband signal at an analog-to-digital converter to create a processed digital signal, and
filtering the processed digital signal to remove the second portion of interference;
wherein the filtering component resamples the processed digital signal from the first sample rate to a second sample rate; wherein the second sample rate is lower than the first sample rate.

20. The system of claim 19, wherein the processed digital signal comprises a first digital signal stream and a second digital signal stream; wherein the filtering component resamples the first digital signal stream from the first sample rate to a second sample rate; wherein the filtering component filters the first digital signal stream after resampling and filters the second digital signal stream without resampling.

21. The system of claim 20, wherein the filtering component resamples the filtered first digital signal stream from the second sample rate to the first sample rate.

22. A system for processing signals, comprising:
a transmitter that transmits an RF transmit signal;
a receiver that receives an RF receive signal; wherein transmission of the RF transmit signal and reception of the RF receive signal occur simultaneously;
an interference cancellation component that samples the RF transmit signal and transforms the sampled RF transmit signal into a self-interference cancellation signal; wherein the self-interference cancellation signal is combined with the RF receive signal to remove a first portion of interference from the RF receive signal, said combination forming a processed RF signal; and
a filtering component that removes a second portion of interference from the processed signal by:
downconverting the processed RF signal to a processed baseband signal,
sampling, at a first sample rate, the processed baseband signal at an analog-to-digital converter to create a processed digital signal, and
filtering the processed digital signal to remove the second portion of interference;
wherein the filtering component performs mapping of a digital transmit signal, using a digital intermediate frequency converter, to a frequency fragment in a wireless frequency band for transmission by the transmitter; wherein the transmitter converts the mapped digital transmit signal into the RF transmit signal.

23. A method for processing signals, comprising:
transmitting an RF transmit signal;
receiving an RF receive signal; wherein transmission of the RF transmit signal and reception of the RF receive signal occur simultaneously;
sampling the RF transmit signal;
transforming the sampled RF transmit signal into a self-interference cancellation signal;
combining the self-interference cancellation signal with the RF receive signal to remove a first portion of interference from the RF receive signal, said combination forming a processed RF signal;
downconverting the processed RF signal to a processed baseband signal;
sampling, at a first sample rate, the processed baseband signal at an analog-to-digital converter to create a processed digital signal; and
filtering the processed digital signal to remove a second portion of interference;
wherein downconverting the processed RF signal comprises downconverting the processed RF signal into a narrowband stream.

24. A method for processing signals, comprising:
transmitting an RF transmit signal;
receiving an RF receive signal; wherein transmission of the RF transmit signal and reception of the RF receive signal occur simultaneously;
sampling the RF transmit signal;
transforming the sampled RF transmit signal into a self-interference cancellation signal;
combining the self-interference cancellation signal with the RF receive signal to remove a first portion of interference from the RF receive signal, said combination forming a processed RF signal;
downconverting the processed RF signal to a processed baseband signal;
sampling, at a first sample rate, the processed baseband signal at an analog-to-digital converter to create a processed digital signal; and
filtering the processed digital signal to remove a second portion of interference;
wherein removal of the first portion of interference results in prevention of receiver saturation;
wherein the first portion of interference is larger than a dynamic range of the analog-to-digital converter.

25. A method for processing signals, comprising:
transmitting an RF transmit signal;
receiving an RF receive signal; wherein transmission of the RF transmit signal and reception of the RF receive signal occur simultaneously;
sampling the RF transmit signal;
transforming the sampled RF transmit signal into a self-interference cancellation signal;
combining the self-interference cancellation signal with the RF receive signal to remove a first portion of interference from the RF receive signal, said combination forming a processed RF signal;
downconverting the processed RF signal to a processed baseband signal;
sampling, at a first sample rate, the processed baseband signal at an analog-to-digital converter to create a processed digital signal; and
filtering the processed digital signal to remove a second portion of interference;
wherein the processed digital signal comprises a first digital signal stream and a second digital signal stream; further comprising resampling the first digital signal stream from the first sample rate to a second sample rate; wherein filtering the processed digital signal comprises filtering the first digital signal stream after resampling and filtering the second digital signal stream without resampling.

26. The method of claim 25, further comprising resampling the filtered first digital signal stream from the second sample rate to the first sample rate.

27. A method for processing signals, comprising:
transmitting an RF transmit signal;
receiving an RF receive signal; wherein transmission of the RF transmit signal and reception of the RF receive signal occur simultaneously;
sampling the RF transmit signal;
transforming the sampled RF transmit signal into a self-interference cancellation signal;
combining the self-interference cancellation signal with the RF receive signal to remove a first portion of interference from the RF receive signal, said combination forming a processed RF signal;
downconverting the processed RF signal to a processed baseband signal;
sampling, at a first sample rate, the processed baseband signal at an analog-to-digital converter to create a processed digital signal; and
filtering the processed digital signal to remove a second portion of interference;
further comprising performing mapping of a digital transmit signal, using a digital intermediate frequency converter, to a frequency fragment in a wireless frequency band for transmission; further comprising converting the mapped digital transmit signal into the RF transmit signal.

* * * * *